(12) United States Patent
Allen et al.

(10) Patent No.: US 12,143,233 B2
(45) Date of Patent: Nov. 12, 2024

(54) AUTOMATED INTEGRATION OF CONFERENCE PARTICIPANT INFORMATION WITH A SHARED CONFERENCE SPACE DIGITAL CALENDAR

(71) Applicant: Zoom Video Communications, Inc., San Jose, CA (US)

(72) Inventors: Reed Hunter Allen, Medford, OR (US); Shane Paul Springer, Oregon City, OR (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/971,007

(22) Filed: Oct. 21, 2022

(65) Prior Publication Data

US 2024/0137236 A1 Apr. 25, 2024
US 2024/0235868 A9 Jul. 11, 2024

(51) Int. Cl.
*H04L 12/18* (2006.01)
*G06Q 10/1093* (2023.01)

(52) U.S. Cl.
CPC ..... *H04L 12/1822* (2013.01); *G06Q 10/1093* (2013.01); *H04L 12/1818* (2013.01)

(58) Field of Classification Search
CPC ............ H04L 12/1822; H04L 12/1818; G06Q 10/1093
See application file for complete search history.

(56) References Cited

U.S. PATENT DOCUMENTS

| | | | |
|---|---|---|---|
| 2012/0150956 A1* | 6/2012 | Tucker | H04L 65/1094 709/204 |
| 2014/0149771 A1* | 5/2014 | Krishna | H04L 51/066 713/323 |
| 2014/0181992 A1* | 6/2014 | Janson | G06F 21/60 726/27 |
| 2015/0142895 A1* | 5/2015 | Beran | G06Q 10/0631 709/206 |
| 2015/0193739 A1* | 7/2015 | Min | G06Q 10/06314 705/5 |
| 2016/0165056 A1* | 6/2016 | Bargetzi | G06F 3/1454 455/416 |
| 2016/0379171 A1* | 12/2016 | Gatzke | G06Q 10/109 705/7.19 |
| 2018/0176270 A1* | 6/2018 | Griffin | H04L 67/52 |
| 2019/0073640 A1* | 3/2019 | Udezue | H04L 12/1818 |
| 2021/0056513 A1 | 2/2021 | Lee et al. | |
| 2021/0264376 A1 | 8/2021 | Kilicoglu et al. | |
| 2021/0264377 A1* | 8/2021 | Ebner | G06Q 10/1093 |
| 2021/0289167 A1 | 9/2021 | Griffin | |
| 2021/0312417 A1* | 10/2021 | Omojola | G06Q 20/40 |

* cited by examiner

*Primary Examiner* — Raqiul A Choudhury
(74) *Attorney, Agent, or Firm* — Young Basile Hanlon & MacFarlane, P.C.

(57) ABSTRACT

A shared conference space system is configured for use with a shared conference space. The shared conference space system determines identities of a set of conference participants of a shared conference space using a sensor. The shared conference space system associates the identities of the set of conference participants to a shared conference space digital calendar associated with the shared conference space and outputs to a display of the shared conference space system a portion of the shared conference space digital calendar including the identities of the set of conference participants.

20 Claims, 14 Drawing Sheets

AUTOMATED INTEGRATION OF CONFERENCE PARTICIPANT INFORMATION WITH A SHARED CONFERENCE SPACE DIGITAL CALENDAR

FIELD

This disclosure relates generally to shared conference space scheduling, and, more specifically, to automated integration of conference participant information with a shared conference space digital calendar.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
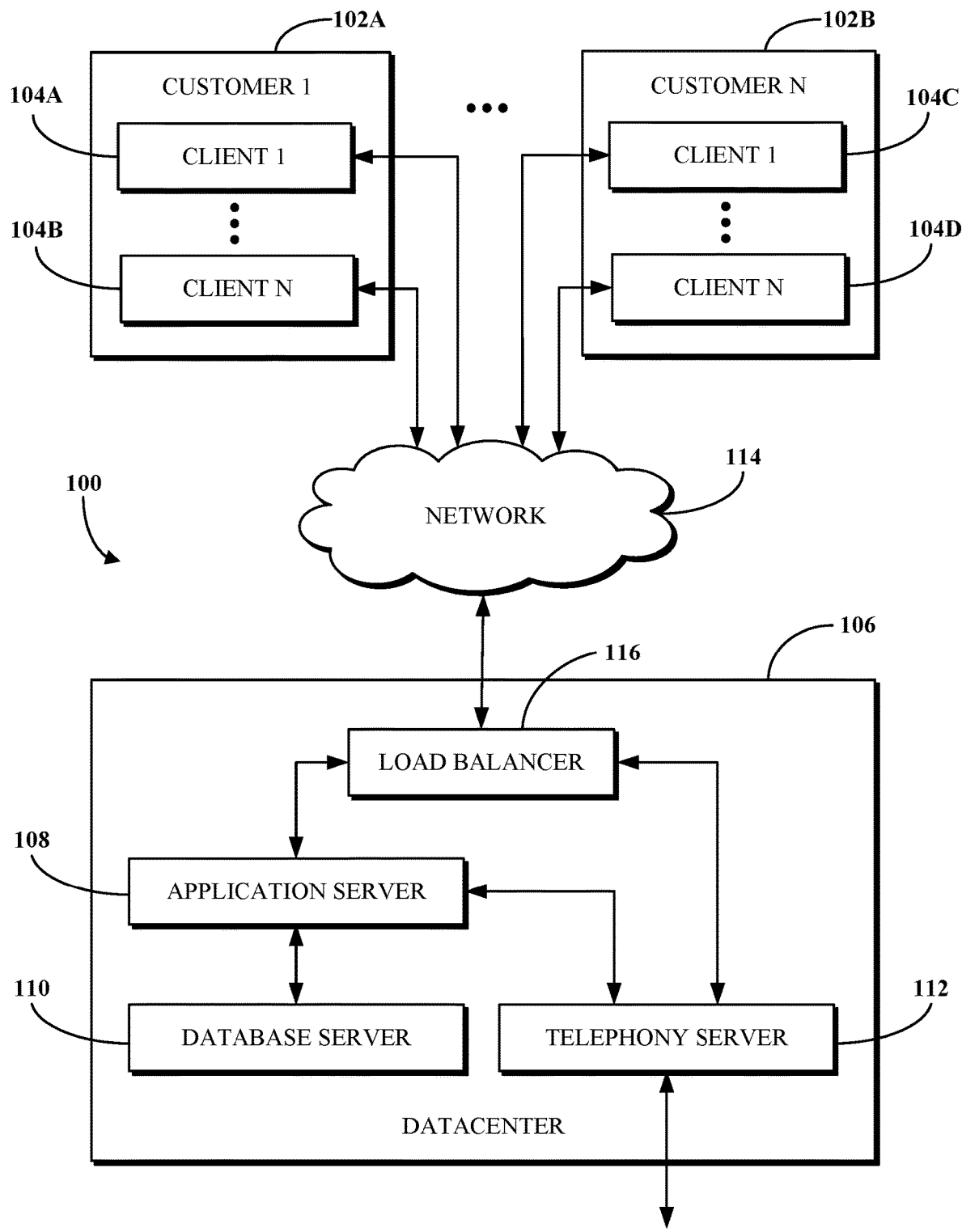
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

One particular example of such a communications service, which may be implemented using a UCaaS platform or otherwise, is a conferencing service that utilizes conferencing software. Conventional video conferencing software, such as that implemented by a UCaaS or other software platform, may be extended to provide hybrid conferences, combining remote conference participants with in-person conference participants located in physical spaces, such as shared conference space. A shared conference space, such as a conference room located in an office, is a physical space configured for hosting one or more in-person participants of a conference, such as a conference facilitated using video conferencing software. Shared conference spaces can, in many cases, be reserved by individuals or groups of people to ensure conferences attended by the people in those rooms remain private. To accommodate reservations or other general use, a shared conference space may have an associated shared conference space digital calendar to track the availability of the shared conference space. The shared conference space digital calendar is a data structure that indicates the times that the shared conference space is or is expected to be in use. The shared conference space digital calendar may include other information such as names and descriptions of scheduled events in the shared conference space, identities of people invited to participate in a video conference from the shared conference space, a record of people who actually attended the conference in the shared conference space, permissions for visibility of conference information, and other information related to the shared conference space.

Reservations of a shared conference space may in some cases be initiated and processed using a digital calendar system that accesses the shared conference space digital calendar for a given shared conference space in response to a request to reserve the shared conference space for some period of time. A potential video conference host may, for example, access the shared conference space digital calendar for a shared conference space to determine an availability of the shared conference space for a conference, schedule use of the shared conference space at a set time for a conference based on such availability, and send conference invitations indicating a use of the shared conference space at the set time to potential conference participants.

In some situations, a person may host an impromptu conference, where participants gather in the shared conference space without scheduling a conference or reserving the shared conference space using the digital calendar service. In other situations, participants in a conference taking place in the shared conference space may determine that they need to schedule another conference with others. Each of these processes may entail a user accessing a calendar service to view a potential participant's schedule, view the shared conference space schedule, schedule the conference including reserving the shared conference space, and invite other potential participants to join the conference. This process may be slow and result in lost time as potential participants navigate through the process of scheduling a conference including locating the shared conference space in the calendar system, finding potential participants, and browsing through potential participant calendars to find a conference time. In some instances, the large number of manual tasks associated with scheduling a conference for a shared conference space may result in potential conference participants avoiding scheduling the shared conference space.

Implementations of this disclosure address problems such as these using a shared conference space system that automates integration of conference participant information in a shared conference space digital calendar. The shared conference space system assists conference participants in scheduling future conferences by integrating the conference participants' information with a shared conference space digital calendar. A conference participant is able to view a schedule view of the shared conference space digital calendar and other conference participants' information so that the conference participant can schedule a conference without having to look up further information or access a separate application. The shared conference space system automatically recognizes the identity of the conference participants so that no further input is necessary on the part of the conference participants to identify themselves or manually share their information.

The shared conference space system includes a display component, a control system component, and a sensor component. The control system component controls the display component and causes the display component to display information such as a schedule view of a shared conference space digital calendar. The sensor component includes at least one sensor or device configured to facilitate the shared conference space system to determine the identities of a set of conference participants. The shared conference space system utilizes the control system component, the display component, and the at least one sensor to determine identities of a set of conference participants, associate the identities of the set of conference participants with a shared conference space digital calendar, and output a shared conference schedule including a portion of the shared conference space digital calendar and the identities of the set of conference participants to a display. The at least one sensor facilitates the shared conference space system in detection of the identity of a conference participant using such techniques as facial image recognition, voice recognition, detecting beacons from an electronic device used by the conference participant, detecting login information associated with the conference participant, or detecting biometric data of the conference participant.

To describe some implementations in greater detail, reference is first made to examples of hardware and software structures used to implement a system for automated integration of conference participant information with a shared conference space digital calendar and functionality thereof. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
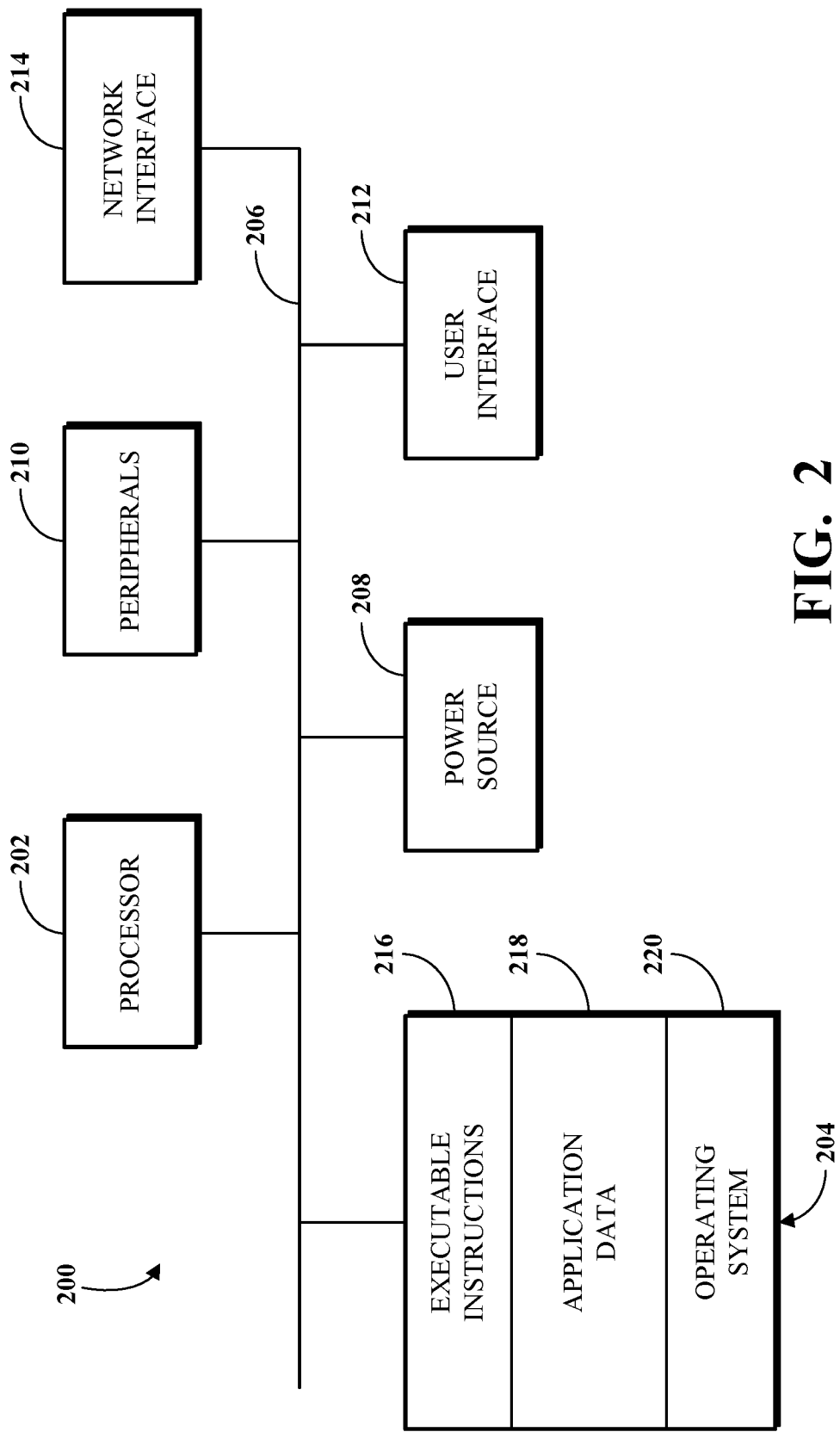
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
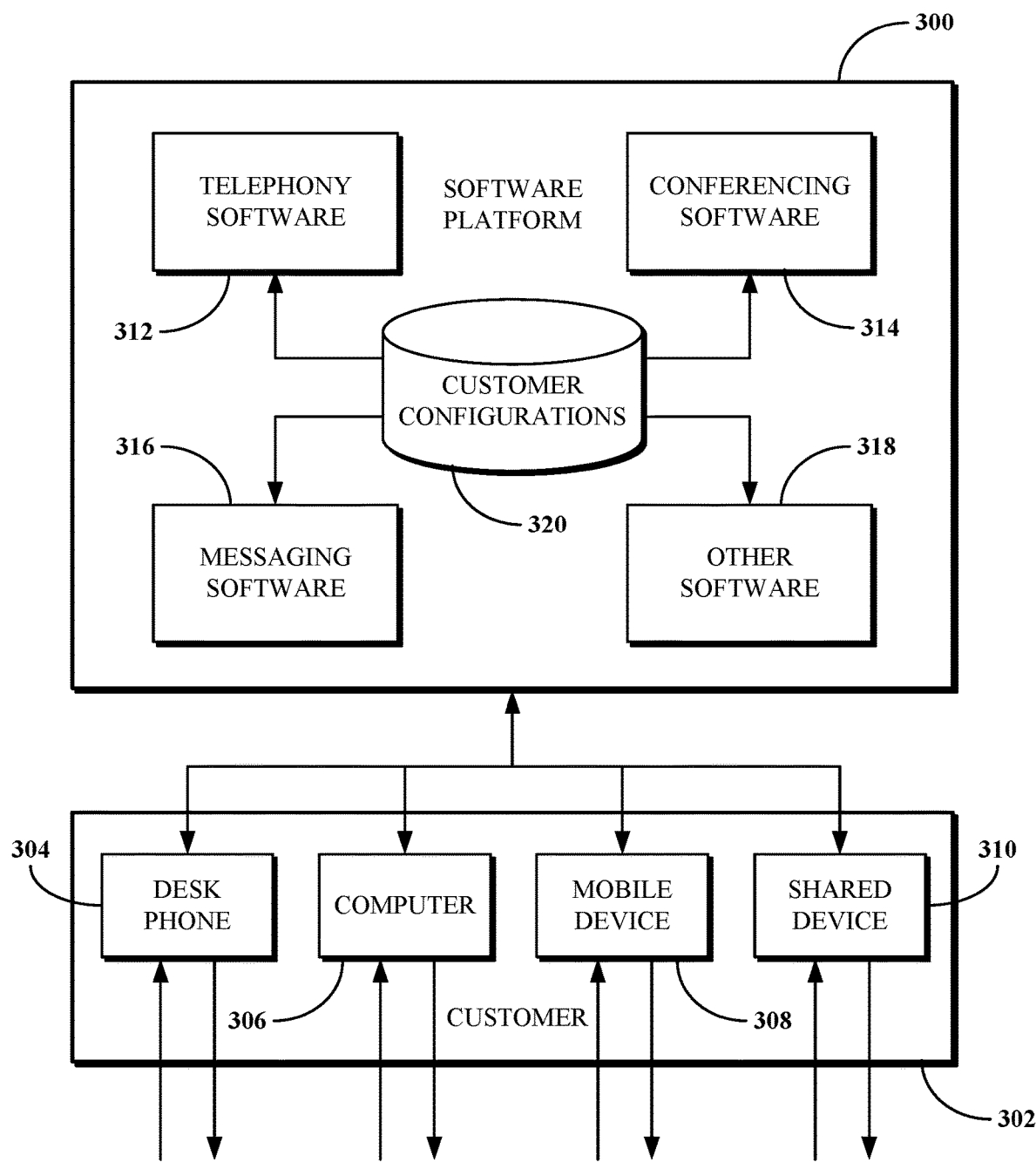
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 utilize customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for a shared conference space system and/or for otherwise integrating participants in a shared conference space digital calendar. In some examples, the shared device 310 may interact with the other software 318 to implement the integration of participants in a shared conference space digital calendar.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
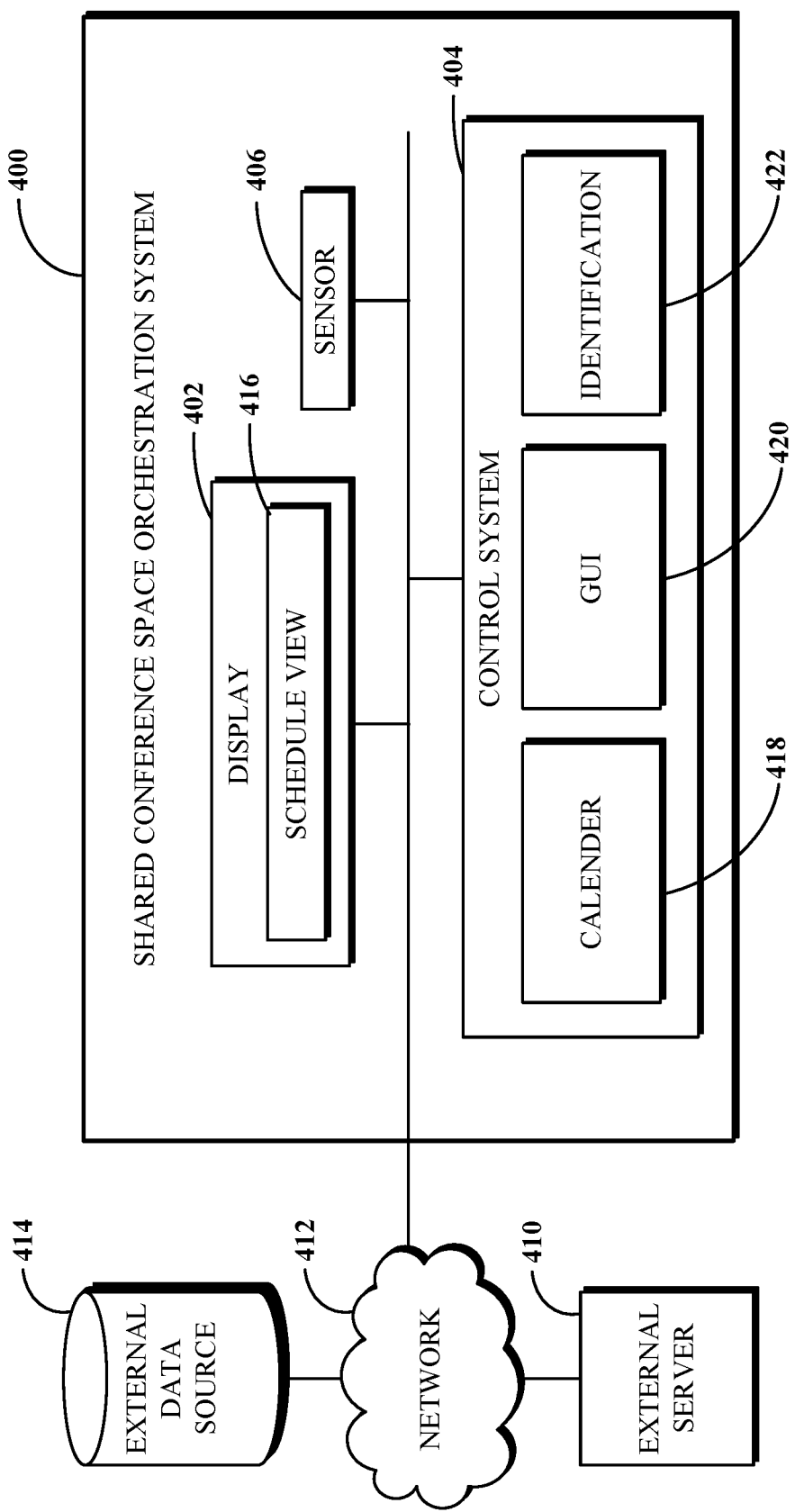
FIG. 4 is a block diagram of an example of a shared conference space system for automated integration of conference participant information with a shared conference space digital calendar.

FIG. 4 is a block diagram of an example of a shared conference space system for automated integration of conference participant information with a shared conference space digital calendar. As shown, the shared conference space system 400 includes a display component 402, a control system component 404, and a sensor component 406. The display component 402 is configured to display a schedule view of a shared conference space digital calendar that includes a portion of a shared conference space digital calendar. The control system component 404 is configured to control the operation of the shared conference space system 404 and is implemented by a computing device, for example, the computing device 200 of FIG. 2. The sensor component 406 is configured to detect a characteristic of conference participants and generate conference participant identifying data that is used to identify a conference participant. In some implementations, the display component 402, the control system component 404, and the sensor component 406 are integrated in a single chassis, while in other implementations at least one of the display component 402, the control system component 404, or the sensor component 406 are discrete components located remotely from the other components.

The display component 402 is configured to display a schedule view 416 of the shared conference space digital calendar on a display device. Examples of display devices suitable for use with the display component include, but are not limited to, cathode-ray tube (CRT) displays, liquid crystal displays (LCDs), organic light emitting diode (OLED) displays, liquid ink displays, and the like. The schedule view 416 displayed on the display device includes time blocks displaying a status of the shared conference space for each time block. The time blocks may include other information such as conference title for a conference scheduled for the shared conference space, conference participants for the scheduled conference, remote access information for the scheduled conference, and other information. As will be described in further detail, the display component 402 is further configured to display information about the conference participants on the display device. For example, the display device displays information related to a conference participant in response to the shared conference room system determining the identity of the conference participant such as the identity of the conference participant and/or digital calendar information of the conference participant.

The information displayed by the display component 402 will be described in more detail in relation to the description of FIGS. 6-10.

The sensor component 406 is configured to capture conference participant identifying information that the shared conference space orchestrations system 400 utilizes to identify the conference participants. The sensor component 406 includes a sensor, group of sensors, or interface for communicating with an external sensor that is operable to generate conference participant identifying information for the conference participants. In some instances the sensor component 406 includes an image sensor operable to generate conference participant identifying information based on an optical characteristic, an audio sensor operable to generate conference participant identifying information based on an audio characteristic, a near field sensor operable to generate conference participant identifying information based on a beacon of an electronic device of a conference participant, a Bluetooth sensor operable to generate conference participant identifying information based on a Bluetooth beacon of an electronic device of a conference participant, a fingerprint sensor operable to generate conference participant identifying information based on a conference participant's fingerprints, a biometric sensor operable to generate conference participant identifying information based on a conference participant's biometric characteristics, or other sensor device. The sensor component 406 is configured to generate conference participant identifying information of potential conference participants as they approach a shared conference space, and/or the sensor component 406 is configured to monitor the conference participants of a shared conference space and update the conference participant identifying information of the conference participants over time. In some implementations, the sensor component is configured to communicate with an access control system for the shared conference space, such that each time a conference participant is granted access to the shared conference space, the access control system shares conference participant identifying information with the shared conference space system 400 by way of the sensor component 406 implementing an interface for communicating with the access control system. The control system component 404 implements software instructions for controlling the shared conference space system 400 including communicating with the display component 402 and the sensor component 404. The software instructions cause the display component 402 to display the shared conference space schedule view and other information as will be described in relation to FIGS. 6-10.

The calendar software 418 is configured to control calendar information for the shared conference space and generate the schedule view 416. The calendar software 418 updates the shared conference space digital calendar responsive to conference participants' interaction with a GUI implemented by GUI software 420. For example, a conference participant interacting with the GUI can request to add a new shared conference space reservation, delete an existing shared conference space reservation, or edit a current shared conference space reservation and the calendar software 418 is configured to update the shared conference space digital calendar accordingly.

The calendar software 418 is further configured to merge conference participant information with the shared conference space digital calendar and present portions of the resulting merged digital calendar in the schedule view. For example, the calendar software 418 may generate a shared conference space schedule view that includes both an original shared conference space schedule and information about a conference participant such as a conference participant's identity or a conference participant's schedule. In some instances, the calendar software 418 controls the digital calendars locally, storing digital calendar data structures and updating the stored digital data structure to reflect updates to the digital calendars. In other instances, the calendar software 418 does not store the digital calendar data locally and utilizes a calendar software service for storing the digital calendar data. In such instances, the calendar software issues instructions to the calendar software service to update digital calendar information stored by the calendar service.

In some instances, the calendar software 418 is responsible for enforcing digital calendar permissions. Each digital calendar, whether the digital calendar is for the shared conference space or for a conference participant, has associated permissions that control what information people can view about the digital calendar. The permissions can be based on a person's identity and specify what people can view times that events occur in the digital calendar, what people can view a list of the conference participants, and/or other permissions. The calendar software 418 is configured to mask portions of a schedule display of the respective digital calendar according to the permissions for the digital calendar of a conference participant.

Each event can have event permissions and the calendar software is responsible for enforcing the event permissions. The event permissions specify what event information is shared including what people can view the event, what people may join the event, what people may modify the event, and/or other permissions. The calendar software 418 is configured to mask event information such as an event title, an event time, and/or other information if a conference participant does not have permission allowing the conference participant to view the respective event information. Masking event information includes displaying a blank entry where the event information would normally be displayed or displaying placeholder information in place of the event information. In some implementations, masking includes the calendar software 418 not downloading the event information from a conference participant digital calendar.

The identification software 422 is configured to determine the identity of the conference participants using conference participant identifying information provided by the sensor component 406. The conference participant identifying information is used by the identification software 422 to identify a conference participant, either using an external service or locally using techniques such as facial recognition, pattern recognition, audio recognition, unique identifiers, and other techniques. For example, employees or other groups of potential conference participants can submit conference participant identifying samples such as fingerprints, photographs, sound samples, digital images, and other identifying information. The identification software 422 associates the conference participant identifying sample with the identity of a potential conference participant. The identification software 422 can then identify conference participants by comparing or otherwise evaluating conference participant identifying information received from the sensor component 406 with the conference participant identifying samples. In some instances, conference participant identifying samples can be retrieved from other data sources such as publicly shared social media information, security system sensors, and/or other information.

The GUI software 420 is configured to provide an interface between the shared conference space system 400 and a conference participant. The GUI software 420 controls the output of the display component 402 and captures conference participant input. In some instances, the display component 402 is an interactive display combining a touch input and a display, or in other instances the input is a separate user input device. The display component 402 and the GUI software 420 implement controls for receiving conference participant inputs from the user input devices. The GUI software generates data for displaying the shared conference space schedule view and user interface (UI) elements for interacting with the shared conference space system 400. The UI elements may provide information to a user such as text data and graphical information and may receive user input such as selections, dragging, and dropping. Implementations and examples of such UI elements will be further described in relation to FIGS. 6-10.

In some implementations, the control system component 404 communicates with an external server 410 and/or an external data source 414 by way of a network 412 to implement the shared conference space system 400. For example, the control system component 404 may access the external data source 414 to obtain conference participant identifying sample information to identify a conference participant, send conference participant identifying information received from the sensor component 406 to an identification service provided by the external server 410 for identifying a conference participant, access various digital calendars stored at the external data source 414 such as the shared conference space digital calendar and/or conference participant digital calendars, or access various digital calendars provided by a calendar software service of the external server 410.

Figure 5:
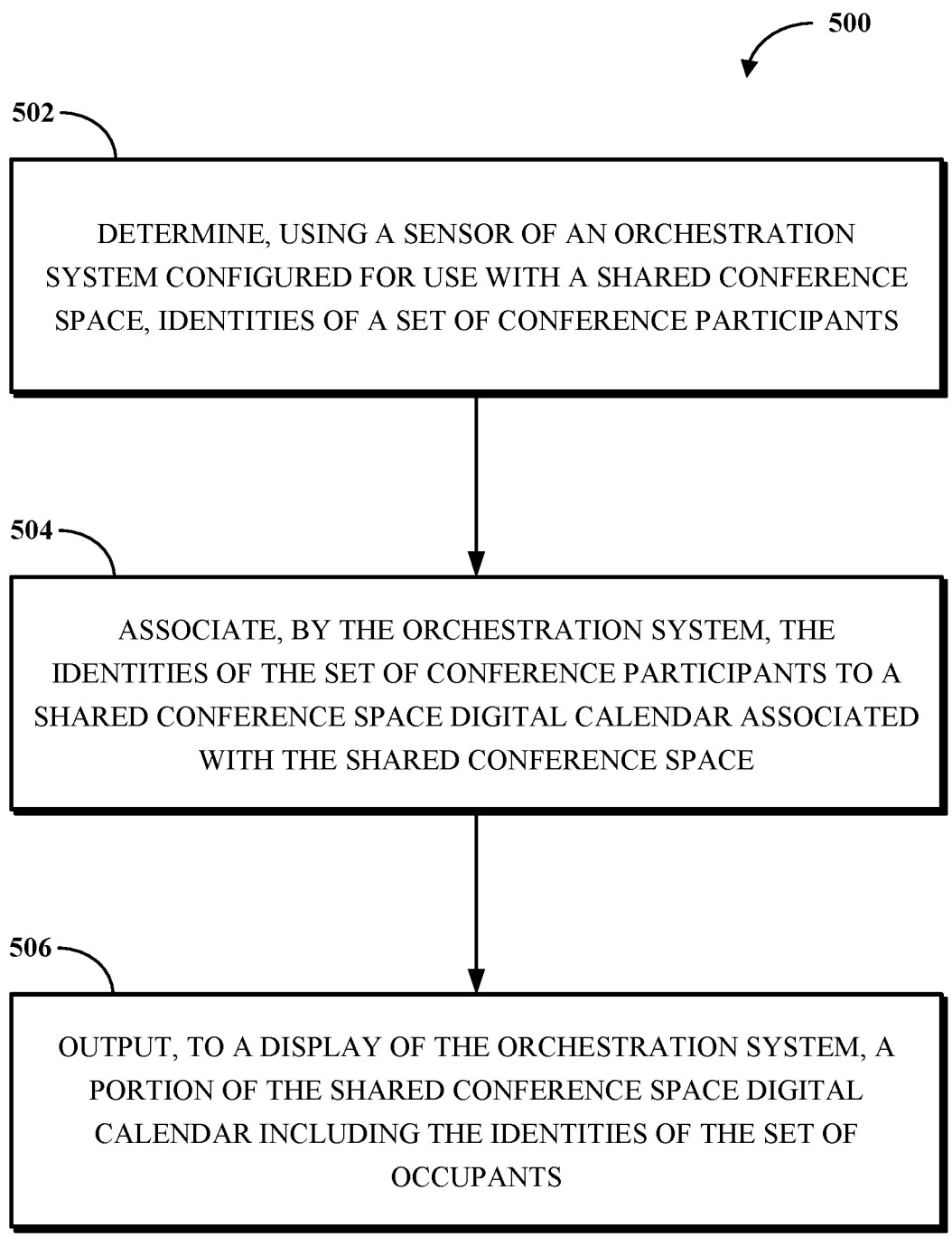
FIG. 5 is a flowchart of an example of a technique for automated integration of conference participant information with a shared conference space digital calendar.

In some instances, the components of the shared conference space system 400 may be integrated in a single housing. For example, a kiosk console may include the display component 402, the sensor component 406, and the control system component 404. In other instances, the components of the shared conference space system 400 may be distributed in multiple devices having separate housings. For example, the display component 402 may be a display device separate from a computer console implementing the control system component 404, and a sensor component 406 may be an image device separate from both the control system component 404 and the display component 402. Other components may be included in the shared conference space system 400 and implementations are not limited to the components shown in FIG. 4. For example, the shared conference space system 400 may integrate with a UCaaS platform such as the software platform 300 of FIG. 3 and include conferencing devices such as video devices, audio devices, interactive whiteboards, and video conference displays. In another example, the shared conference space system 400 may include an environmental control system for the shared conference space for controlling environmental features such as lighting and temperature. In some instances, the shared conference space system 400 may include additional functionality corresponding to a client such as one of clients 104A-D of FIG. 1 and/or one of the clients 304-310 of FIG. 3. To further describe some implementations in greater detail, reference is next made to examples of techniques which may be performed by or using a shared conference space system. FIG. 5 is a flowchart of an example of a technique 500 for automated integration of conference participant information with a shared conference space digital calendar. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The steps, or operations, of the technique 500 or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 502, a shared conference space system configured for use with a shared conference space determines identities of a set of conference participants of a shared conference space using a sensor associated with the shared conference space. The shared conference space system can be the shared conference space system 400 of FIG. 4. The conference participants include attendees of a current conference taking place in the shared conference space, informal conference attendees occupying the shared conference space outside of a conference scheduled in the shared conference space, and/or future conference participants adjacent to a display of a shared conference space system.

More particularly, and with reference to the shared conference space system 400 of FIG. 4, the sensor component 406 generates conference participant identifying information based on a characteristic of a conference participant captured by the sensor component 406 and provides the control system component 404 with the conference participant identifying information. The control system component 404 then uses the conference participant identifying information to determine the identity of the conference participant. The process may be repeated for other conference participants. For example, in some instances the sensor component 406 captures a facial image of a conference participant, generates conference participant identifying information based on the facial image, sends the conference participant identifying information related to the facial image to the control system component 404, and the control system component 404 uses the conference participant identifying information related to the facial image to determine the identity of the conference participant. In some instances, the control system component 404 determines the identity of the conference participant by sending the occupant identifying information to an image recognition software service, which then returns the identification of the occupant to the control system component 404.

At 504, the shared conference space system, associates the identities of the set of conference participants to a shared conference space digital calendar associated with the shared conference space. More particularly, and with reference to the shared conference space system 400 of FIG. 4, the calendar software 418 associates the identities of the set of conference participants to the shared conference space digital calendar by linking data representing the identities of the set of conference participants to the shared conference space digital calendar. In instances in which there is currently a conference in progress in the shared conference space, the identification of the conference participants can be linked to a digital calendar event for the current conference. In instances in which there is not currently a conference in progress in the shared conference space, the calendar software 418 can create an event in the shared conference space digital calendar for the current time block and link the identity of the conference participants to the newly created event.

At 506, a portion of the shared conference space digital calendar is output to a display of the shared conference space system. The portion of the shared conference space digital calendar includes the identities of the set of conference participants. More particularly, and with reference to the shared conference space system 400 of FIG. 4, the GUI software 420 outputs a schedule view 416 of the shared conference space digital calendar including information identifying the set of conference participants. In some instances, the schedule view 416 may be a GUI element displaying a timeline of events for the current day and the information identifying the set of conference participants is a GUI element displaying an identifier/name or image of a conference participant. The GUI element displaying the identifier/name or image of the conference participant can be linked with a conference occurring in the shared conference space to associate the conference participants with the shared conference space.

The technique 500 can include the shared conference space system accessing digital calendar data for a conference participant of the set of conference participants and adding the digital calendar data to the portion of the shared conference space digital calendar. In some instances, the digital calendar data is conference participant digital calendar information including events scheduled for the current day. Adding the digital calendar data to the portion of the shared conference space digital calendar can include adding the events scheduled for the current day to the digital calendar data to generate a schedule view that displays the scheduled events next to a schedule of reservations for the shared conference space. Adding the digital calendar data to the portion of the shared conference space digital calendar allows a conference participant to quickly observe the availability of the other conference participants to set up a future conference and facilitates the conference participants in scheduling a new conference as will be described hereafter.

The technique 500 can include the shared conference space system accessing sharing permissions for conference participant digital calendars of the set of conference participants and verifying that the sharing permissions for the set of conference participants allow sharing the digital calendar with the set of conference participants. More particularly, and with reference to the shared conference space system 400 of FIG. 4, the control system component 404 can reference a permission for each conference participant calendar, either within the conference participant digital calendar, within a data structure associated with the digital calendar that contains the permissions, or from an external software service. The permissions indicate, for each conference participant digital calendar, if the shared conference space system 400 is allowed to display the events in the conference participant digital calendar. The control system component 404 may verify that the permissions exist, and that sharing is allowed before the outputting to the display component 402 a conference participant digital calendar of a conference participant.

In some implementations, the shared conference space system 400 allows a conference participant to modify their permissions. The shared conference space system can infer that a conference participant wants to change a permission such as granting the shared conference space system 400 access to a conference participant digital calendar associated with the conference participant. For example, the shared conference space system 400 can infer that a conference participant wants to grant access to the conference participant digital calendar associated with the conference participant in response to the conference participant accessing the shared conference space system 400 to schedule a conference. Or, in another example, the shared conference space system 400 can infer that the conference participant would like to grant the shared conference space system 400 access to the conference participant calendar associated with the conference participant in response to a different conference participant attempting to add the conference participant to a conference. The shared conference space system 400 can verify that the conference participant intends to change the permissions by requesting that the conference participant confirm the change. For example, the shared conference space system 400 can request a verbal confirmation or prompt the conference participant to input a confirmation. The shared conference space system 400 can verify the conference participant identity using a sensor component prior to making the change to the permissions.

The technique 500 can also include the shared conference space system determining the identifies of a second set of conference participants of the shared conference space and accessing sharing permissions for conference participant digital calendars of the second set of conference participants. The shared conference space system verifies that the sharing permissions of the conference participant digital calendars of the second set of conference participants do not allow sharing the digital calendars of the second set of conference participants. In response to verifying that the sharing permissions do not allow sharing the digital calendars, the shared conference space system can mask the digital calendar data of the second set of conference participants in the display of a portion of the shared conference space digital calendar prior to adding the digital calendar data of the set of conference participants to the portion of the shared conference space digital calendar. The shared conference space system determines the identity of the second set of conference participants in the same manner as identifying the set of conference participants at 502. The shared conference space system can determine the identity of the second set of conference participants while identifying the set of conference participants at 502. Thus, the shared conference system can group conference participants into a first set that have conference participant digital calendars with permissions that allow the sharing of the conference participant digital calendar and a second set of conference participants that have digital calendar permissions that do not allow the sharing of the conference participant digital calendars. The shared conference space system verifies that sharing permissions for the conference participant digital calendars of the second set of conference participants does not allow sharing and masks the events for the conference participant digital calendars of the second set of conference participants in the display. In some instances, a GUI element for the masked conference participant digital calendar displays a blank digital calendar in place of any scheduled events.

The technique 500 can also include the shared conference space system determining that a conference participant of the set of conference participants left the shared conference space, removing an identity of the conference participant from the shared conference space digital calendar to generate an updated shared conference space digital calendar, and outputting an update to the display of a portion of the shared conference space digital calendar to reflect the updated shared conference space digital calendar. For example, the sensor component 406 can send updated conference participant identifying information to the control system component 404 that no longer includes conference participant identifying information for the conference participant who left the shared conference space. Based on the conference participant identifying information not being present for the conference participant who left, the shared conference space system determines that the conference participant is no longer present in the shared conference space.

The technique 500 can also include the shared conference space system updating the digital calendars of the set of conference participants to indicate that they are in a conference currently scheduled in the shared conference space. For example, the shared conference space system can add a conference currently occurring in the shared conference space to the conference participant digital calendar.

The technique 500 can also include the shared conference space system receiving an input from a conference participant selecting a time block for a second conference in the shared conference space, reserving the shared conference space for the time block and the conference participant, and prompting the conference participant to invite the other conference participants to the second conference. For example, a conference participant can interact with a GUI of a display component to select an open time block for reserving the shared conference space as shown in the schedule view and schedule a conference for the conference participant in the shared conference space. The shared conference space system then reserves the shared conference space for the conference and the GUI displays an invitation interface with a prompt for the conference participant to invite the other conference participants to join the conference. Thus, the shared conference space system facilitates the conference participant in setting up a new conference that includes the current conference participants without requiring the conference participant to manually find and invite each conference participant of the shared conference space to join the second conference.

Figure 6:
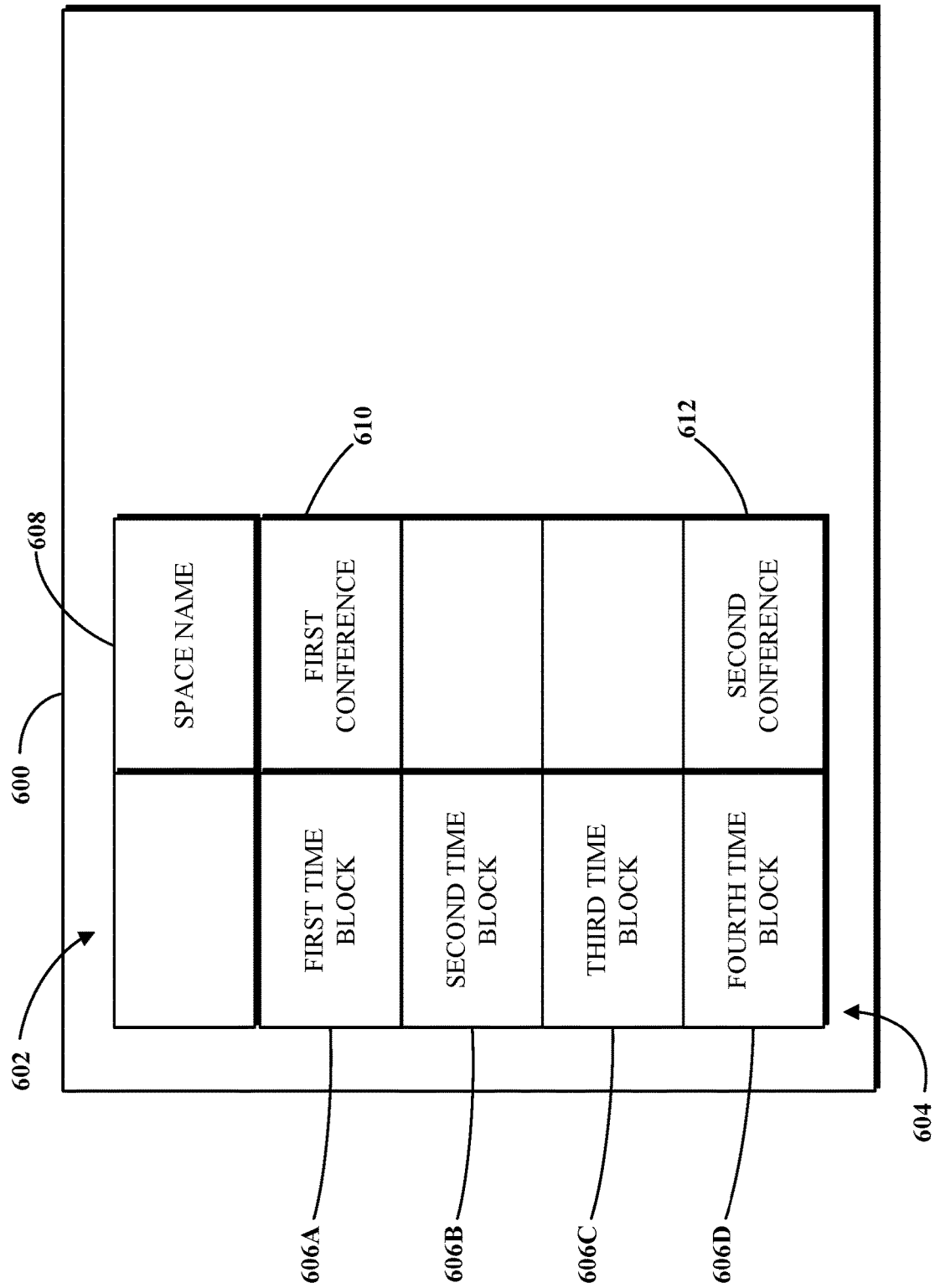
FIGS. 6-10 are illustrations of examples of graphical user interfaces (GUIs) for automated integration of conference participant information with a shared conference space digital calendar.

FIG. 6 is an example of a GUI 600 for use with a system for automated integration of conference participant information with a shared conference space digital calendar. The display component 402 of the shared conference space system 400 of FIG. 4 is configured to display the GUI 600. Other formats and GUIs are possible, and the GUI of FIG. 6 is merely one possible implementation. The GUI 600 of FIG. 6 is an example of the GUI 600 when no conference participants have been identified by the shared conference space system. The GUI 600 displays a schedule view 602 of the shared conference space digital calendar and includes a time schedule 604, four time blocks 606A-606D in the time schedule 604, a shared conference space name 608, a first conference 610 occurring during time block 606A, and a second conference 612 occurring during time block 606D. The GUI may display other information not shown. Although four time blocks are shown in this implementation, the GUI can display more or less than four time blocks. Additionally, the GUI can display more or less than two conferences depending on the number of conferences scheduled for the shared conference space.

Figure 7:
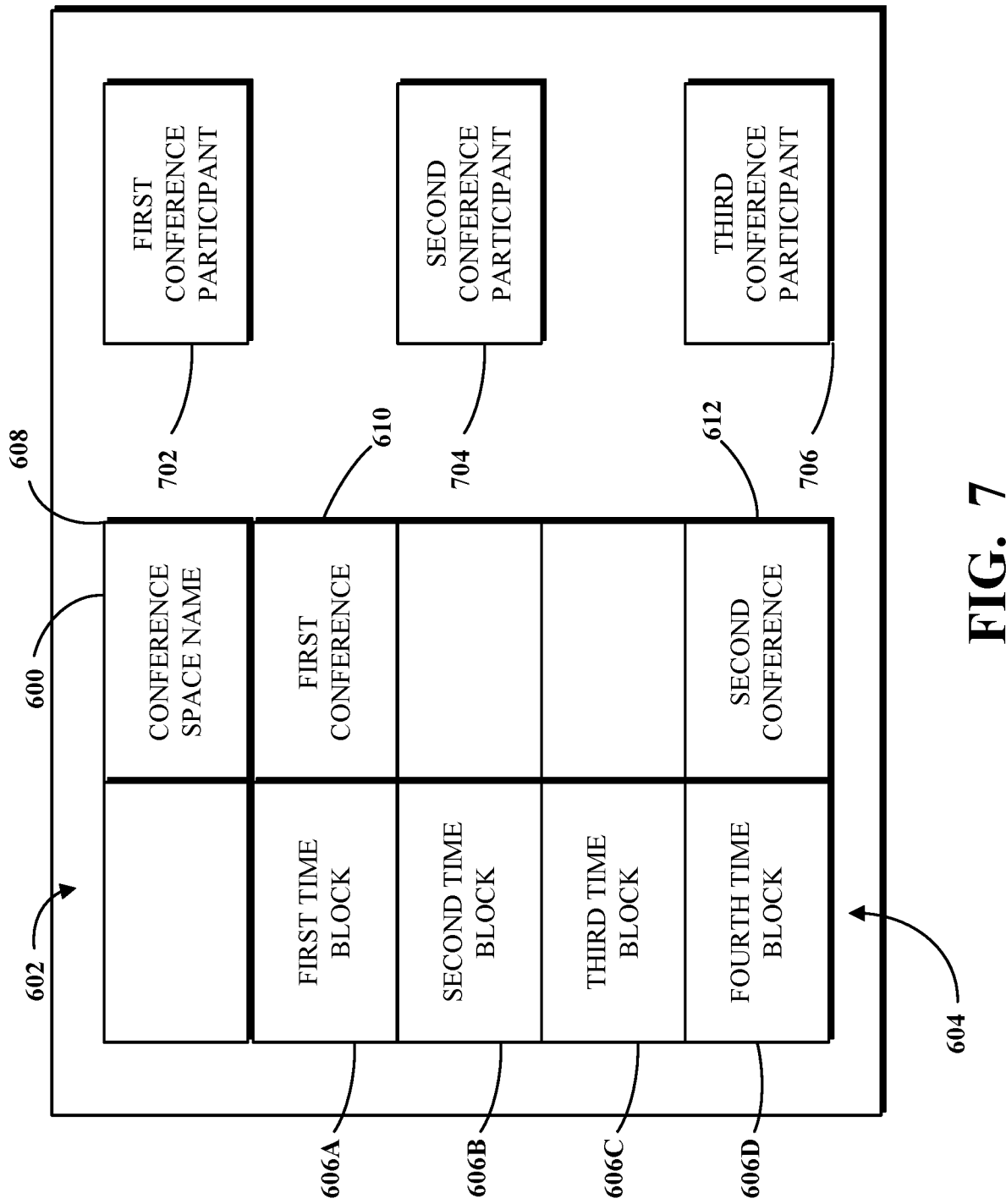

FIG. 7 is an example of the GUI 600 of FIG. 6 after the shared conference space system identifies three conference participants. As described in relation to the technique of FIG. 5, the identity of the conference participants is determined by the shared conference space system and the shared conference space system updates the GUI 600 to include a GUI element for the conference participants. In the example of FIG. 6, there are three conference participants represented by a first GUI element 702, a second GUI element 704, and a third GUI element 706. The GUI elements include information such as an identification of the conference participant, a graphic representing the conference participant, or a combination of an identification and a graphic representing the conference participant.

The GUI 600 in the state shown in FIG. 7 is presented to the conference participants after the shared conference space system has recognized the conference participants. The GUI 600 in the state of FIG. 7 facilitates scheduling the shared conference space for the conference participants. In one implementation, a conference participant selects a GUI element corresponding to that conference participant and drags the respective GUI element to a time block in the shared conference space digital calendar view to create a conference and reserve the shared conference space. The conference participant can perform this action for another conference participant to add them to the reservation. This process may be repeated to invite other conference participants. In instances in which a conference is already scheduled in the shared conference space, for example the first conference 610, the conference participant corresponding to the GUI element dragged to the conference is added to added to the conference. For instance, a conference participant can drag the first GUI element 702 to the first block of time 606A or to the first conference 610 to add the conference participant associated with the first GUI element 702 to the first conference 610.

The combination of automatically determining the identity of the conference participants and adding their information to the schedule view of the shared conference space digital calendar simplifies the process of scheduling conferences from within the shared conference space. In place of a conference participant navigating their own digital calendar, checking the shared conference space digital calendar to determine an open time, reserving the open time, and sending an invite out to each of the room conference participants, the conference participant may quickly schedule a conference by dragging the appropriate GUI element to the desired time block in the schedule view of the shared conference space digital calendar. The ease at which additional conferences may be scheduled and the shared conference space reserved can increase the usage of the reservation system for the shared conference space and reduce the amount of time that conference participants spend reserving a shared conference space.

Figure 8:
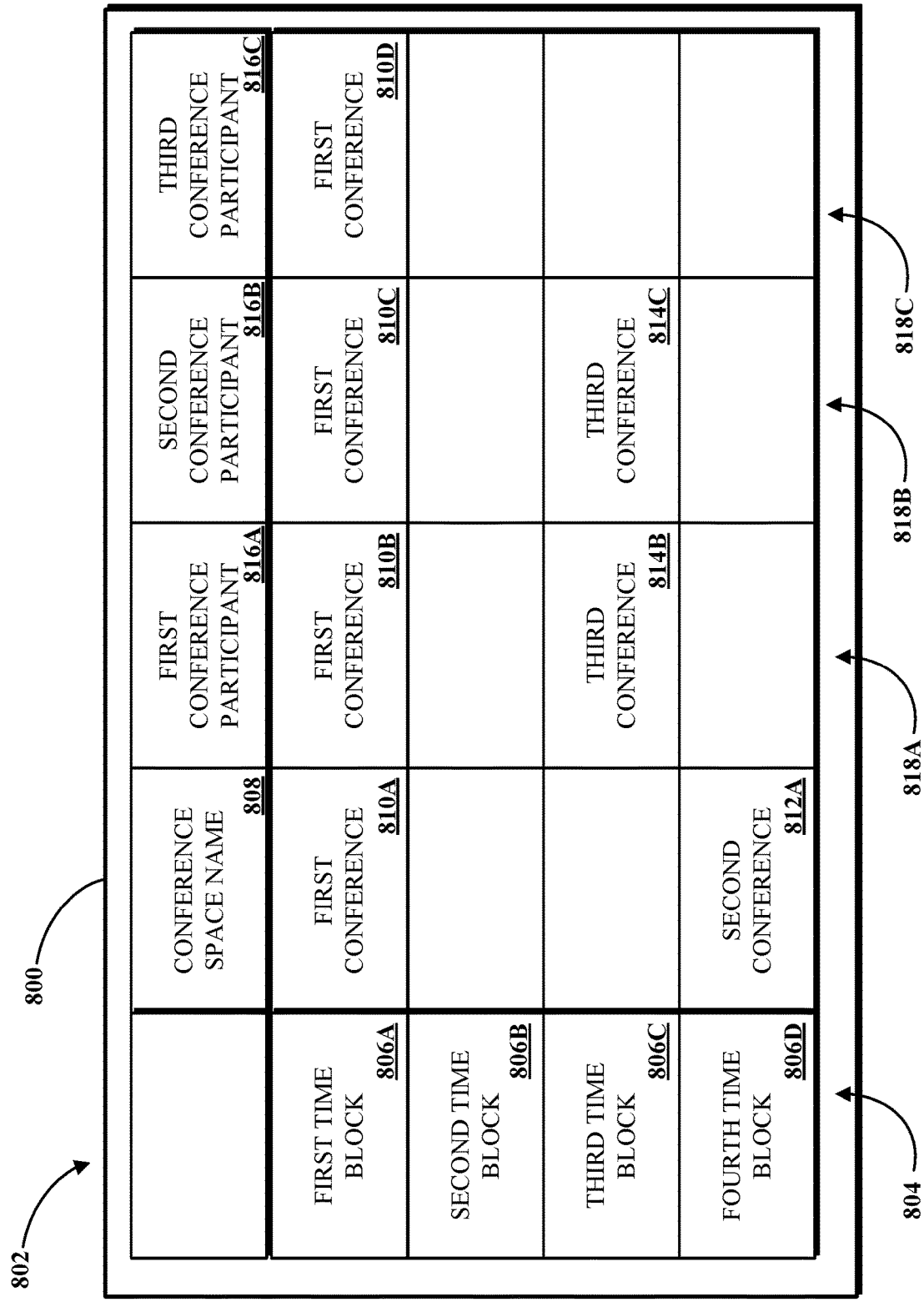

FIG. 8 illustrates another example of a GUI 800 displayed by a shared conference space system, such as the shared conference space system 400 of FIG. 4. The GUI 800 of FIG. 8 is similar to the GUI 600 of FIG. 7 in that the GUI 800 displays a schedule view of a shared conference space digital calendar 802 that includes a time schedule UI element 804, four time block UI elements 806A-806D (collectively referred to as time block UI elements 806) within the time block UI element 804, a shared conference space name UI element 808, a first conference UI element 810A during first time block 806A for the shared conference space, a second conference UI element 812A occurring during time block UI element 806D for the shared conference space, a first conference participant UI element 816A associated with a first conference participant, a second conference participant UI element 816B associated with a second conference participant, and a third conference participant UI element 816C associated with a third conference participant (collectively referred to as conference participant UI elements 816). The GUI 800 of FIG. 8 differs from the GUI 700 of FIG. 7 in that the GUI 800 additionally includes a schedule view of a first conference participant digital calendar 818A, a schedule view of a second conference participant digital calendar 818B, and a schedule view of a third conference participant digital calendar 818C (collectively referred to as conference participant digital calendars 818). The schedule view of the conference participant digital calendars 818 is added to the schedule view of the shared conference space digital calendar 802 by the shared conference space system in response to the shared conference space system determining the identities of the conference participants. In some instances, no further interaction is needed on the part of the conference participants to add their identities to the schedule view of the shared conference space digital calendar 802, as the schedule view of the conference participant digital calendars 818 are added alongside the schedule view of the shared conference space digital calendar 804A based on the shared conference space system determining the identity of the conference participants.

In some implementations, the shared conference space system may add a current conference scheduled for the shared conference space to the conference participant digital calendars 818 of the conference participants identified by the shared conference space system. For instance, if the current time falls within the first time block 806A and the first conference is in session, or the current time falls within a user defined buffer time around the first time block 806A, the first conference participant, the second conference participant, and the third conference participant may automatically be added as participants to the first conference based on the shared conference space system recognizing the conference participants. Furthermore, in some instances the shared conference space system may automatically update the conference participant digital calendars 818 to indicate that the conference participants are in the first conference. For example, in FIG. 8 the conference participant digital calendars 818 indicate that the conference participants have the first conference scheduled in the first time block 806A as indicated by first conference UI elements 810B-810D located in the respective schedule view of the conference participant digital calendars 818 in the first time block 806A. This may occur without any conference participant interaction based on the conference participant identities being determined by the shared conference space system.

In the example of FIG. 8, the conference participant digital calendars 818 are arranged with the conferences of the schedule view of the conference participant digital calendars 818 positioned as time aligned columns next to a column of the schedule view of the shared conference space digital calendar 802. Other arrangements are possible, and this is merely one example. Additionally, the GUI 800 can include functionality for scrolling the schedule view for instances when the number of time block UI elements 806 and/or the number of conference participant UI elements 816 exceeds what the screen component can display.

The GUI 800 of FIG. 8 includes schedule views of the conference participant digital calendars 818 for each of the conference participants. For example, during the first time block 806A, the schedule view of the first conference participant digital calendar 818A, the second conference participant digital calendar 818B, and the third conference participant digital calendar 818C, each show that the respective conference participant is scheduled to be in the first conference. A second conference UI element 812A indicates that a second conference is scheduled to take place in the shared conference space during the fourth time block 806D and third UI elements 814B, 814C indicate that the first conference participant and the second conference participant have a third conference scheduled during the third time block 806C, but that the third conference is not scheduled to take place in the shared conference space. The schedule view of the third conference participant digital calendar 818C indicates that the third conference participant has no other conferences scheduled.

The conference participants can schedule a new conference, join an existing conference scheduled for the shared conference space, or reserve the shared conference space by interacting with the GUI 800 and the UI elements. Because the schedule view of the shared conference space digital calendar 802 and the conference participant digital calendars 818 are presented by the shared conference space system together, a conference participant can make scheduling changes without having to use a separate device or input additional information. For example, if the first conference participant and the second conference participant review the schedule view of the GUI 800 and observe that the shared conference space is not scheduled during the third time block 806C when the first conference participant and second conference participant are having the third conference, the first conference participant and the second conference participant may determine to schedule the shared conference space during the third time block 806C for the third conference. The first conference participant or the second conference participant may easily reserve the shared conference space using the GUI 800. In some implementations, the conference participant drags a conference participant UI element 816 onto the desired time block UI element 806 or an empty location in the schedule view of the shared conference space digital calendar 802, which begins reserving the shared conference space for the respective time block. Of note, the conference participant UI element for the other conference participants scheduled to attend the third conference space do not need to be dragged onto the time block to add their information to the conference space reservation, since the other conference participants are already associated with the third conference. Additionally, in some instances, the shared conference space system displays a prompt asking if other conference participants present in the shared conference space but not scheduled to attend the third conference, such as the third conference participant, should be added to the conference.

Figure 9:
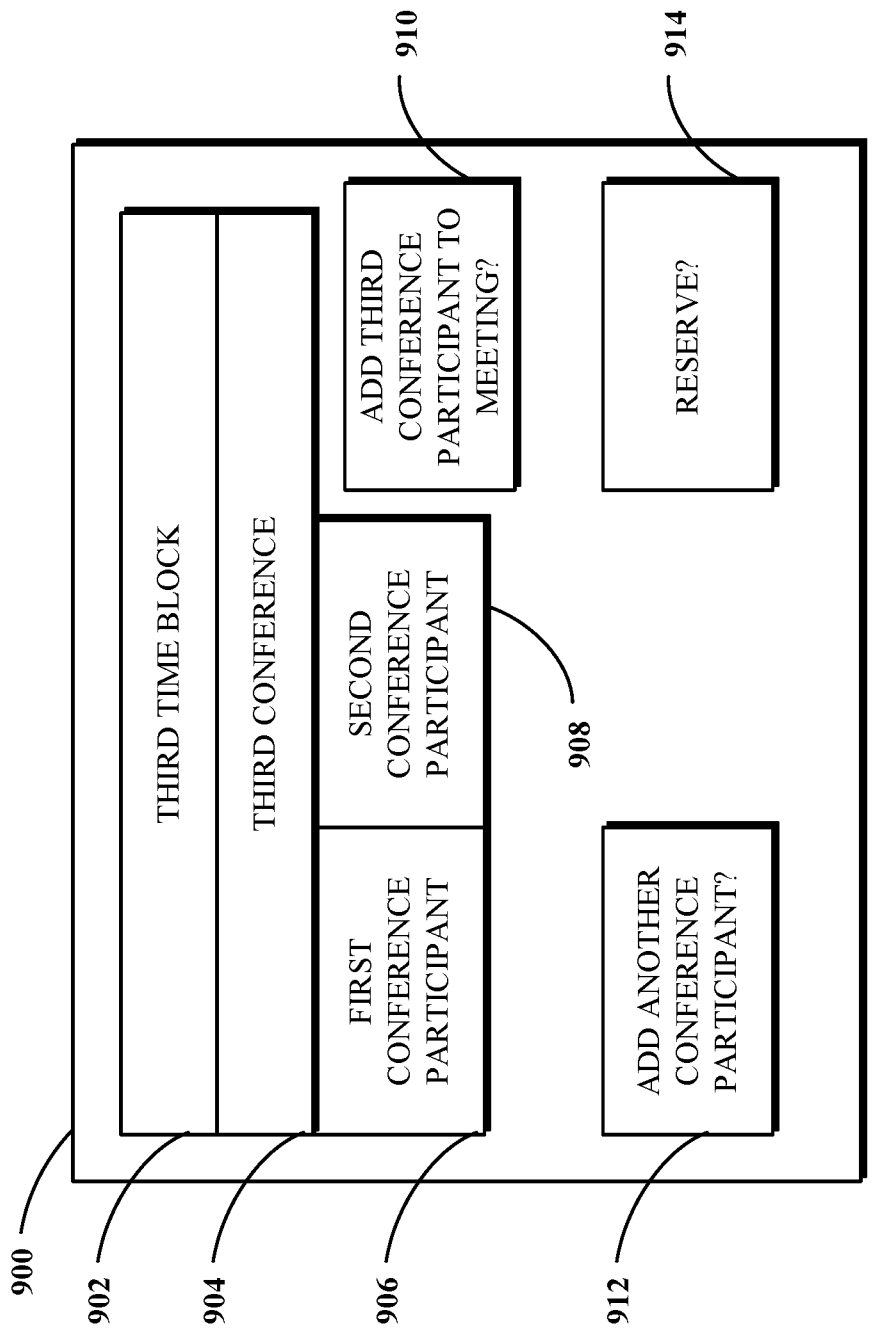

FIG. 9 illustrates an example of a GUI 900 displayed by the shared conference space system in response to the first conference participant scheduling the third conference for the third time block 806C. The GUI 900 displays information about the conference such as a time block UI element 902 displaying the time the conference is scheduled to occur, a conference name UI element 904 displaying the name of the conference, a first conference participant UI element 906 representing the first conference participant, a second conference participant UI element 908 representing the second conference participant, and a third conference participant UI element 910 representing the third conference participant. The third conference participant UI element 910 includes information indicating that the third conference does not currently include the third conference participant. For instance, in FIG. 9, the third conference participant UI element 910 is offset from the first conference participant UI element 906 and the second conference participant UI element 908 and includes the text "ADD THIRD CONFERENCE PARTICIPANT TO CONFERENCE?" The GUI 900 further includes an add conference participant UI element 912 for adding additional participants not in the shared conference space and a confirmation UI element 914 for confirming the shared conference space reservation.

Thus, referring to FIG. 8 and FIG. 9, the first conference participant can select the first conference participant UI element 816A and drag and drop the first conference participant UI element 816A to the third time block 806C of the schedule display of the shared conference space digital calendar 802. In response, the shared conference space system presents the first conference participant with the GUI 900 of FIG. 9. The first conference participant then selects the third conference participant UI element 910C to invite the third conference participant to the third conference. If the first conference participant needs to add any other conference participants, the first conference participant selects the add another conference participant UI element 912 to invite any other conference participants. When the first conference participant is satisfied with the selection of the conference participants, the first conference participant selects the confirmation UI element 914 to complete reserving the shared conference space and invite any additional participants.

Figure 10:
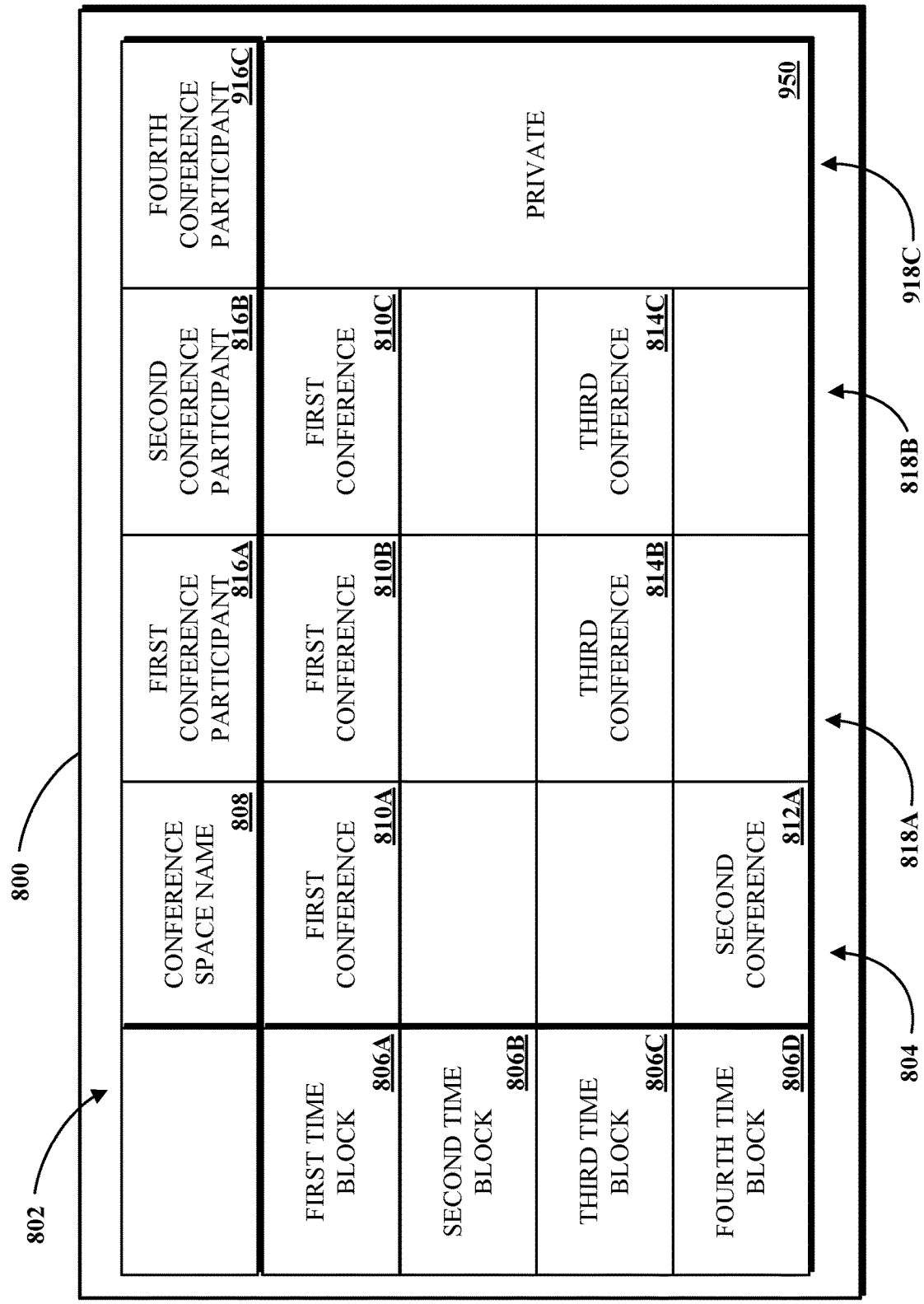

FIG. 10 illustrates the example GUI 800 of FIG. 8, but in this example a fourth conference participant has replaced the third conference participant shown in FIG. 8. In some instances, the shared conference space system automatically removes a conference participant and the schedule view of their digital calendar from the shared conference space digital calendar in response to the shared conference space system determining that the conference participant left the shared conference space. In the example of FIG. 10, the third conference participant has left the shared conference space so that the third conference participant UI element 816C is no longer displayed for the third conference participant and the schedule view of the third conference participant digital calendar 818C is no longer displayed.

The shared conference space system can determine that a conference participant has left the shared conference space using a sensor component. For example, if the shared conference space system utilizes an optical sensor and facial recognition to determine the identities of the conference participants, the shared conference space can determine that a conference participant has left the shared conference space when the conference participant is no longer identified. Or, in another example, the shared conference space system may employ an additional sensor in the sensor component near an exit of the shared conference space that is operable to determine the identity of a conference participant as they leave the shared conference space. For example, a second optical sensor may be used to determine the identity of a conference participant as they exit the shared conference space.

In the example of FIG. 10, the identity of a fourth conference participant of the shared conference space has been determined by the shared conference space system as indicated by the presence of the fourth conference participant UI element 916C. The shared conference space system can determine the identity of the fourth conference participant using the same techniques that were used to determine the identity of the other conference participants. In response to determining the identity of the fourth conference participant, the shared conference space system adds the identity of the conference participant to the shared conference space digital calendar in the form of the fourth conference participant UI element 916C.

The shared conference space system implements permissions to display a schedule view of a conference participant digital calendar only if the conference participant selects to share their digital calendar. In the example of FIG. 10, the fourth conference participant has an associated permission that does not allow the sharing of the fourth conference participant digital calendar. Thus, in place of an indication of conferences the fourth conference participant has scheduled in a schedule view, a single private UI element 950 is displayed. Although the GUI 800 does not display any events of the fourth conference participant digital calendar, the fourth conference participant may be added to an existing conference and/or schedule the shared conference space in the same manner as conference participants that share their digital calendars. For example, a conference participant may drag and drop the fourth conference participant GUI element 916C to a time block of the schedule view of the shared conference space digital calendar to reserve the shared conference space or join an existing conference in the shared conference space. Thus, the shared conference space system maintains the privacy of the fourth conference participant digital calendar but still allows the fourth conference participant to take advantage of the scheduling features provide by the GUI.

Figure 11:
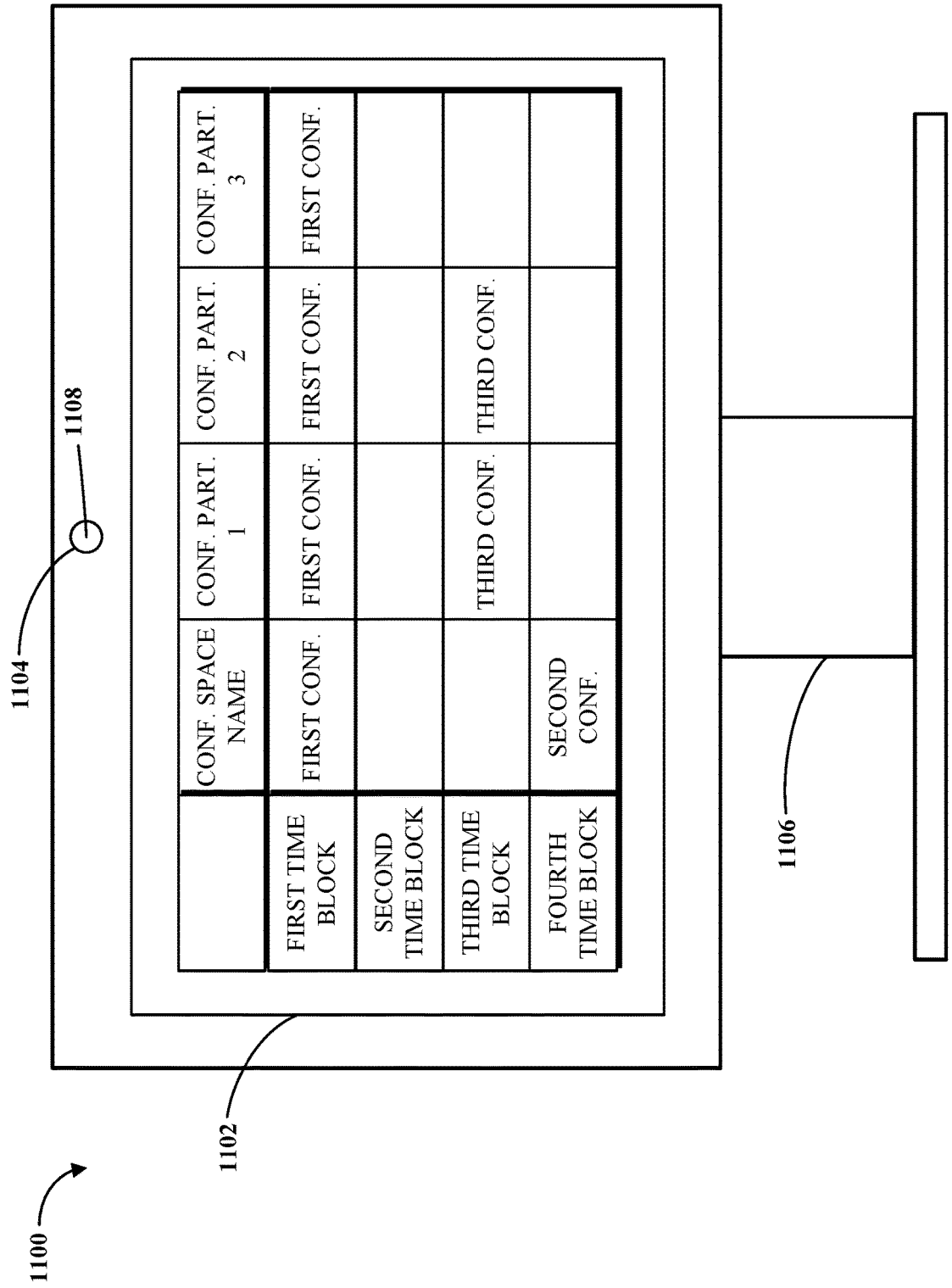
FIG. 11 is an illustration of an example of a shared conference space system for automated integration of conference participant information with a shared conference space digital calendar integrated in a single housing.

FIG. 11 is an illustration of an example of a shared conference space system 1100 for automated integration of conference participant information with a shared conference space integrated in a single housing 1106. The example shared conference space system 1100 can be located within a shared conference space and configured to allow for conference participants to interact with the shared conference space system 1100. In some implementations, the shared conference space system 1100 is located on a table in the shared conference space or, in other implementations, is mounted to a wall of the shared conference space. Conference participants interact with the shared conference space system 1100 through input devices such as a touch screen to select items and register inputs such as selecting time blocks, or using external input devices such as a keyboard or a mouse for selecting items and registering inputs.

The shared conference space system 1100 includes a display component 1102, sensor component 1104, and control system (not visible) in the single chassis 1106. In the example of FIG. 11, the shared conference space system 1100 implements a sensor component 1104 in the form of an image sensor 1108. The image sensor 1108 captures images of conference participants in front of the display component 1102. In some instances, the shared conference space system 1100 includes additional image sensors at other locations in the single chassis 1106 to capture images of conference participants who are not in front of the display component 1102. For instance, an additional image sensor may be located on the back of the single chassis 1106 to capture images of conference participants behind the shared conference space system 1100. Image data captured by the image sensor 1108 is used as conference participant identifying information by the shared conference space system 1100 to determine the identity of the conference participants as described previously.

The shared conference space system 1100 of FIG. 11 is depicted having an image sensor for generating conference participant identifying information for determining the identities of the conference participants, but other examples may have other sensor types for generating conference participant identifying information. For example, the integrated shared conference space system 1100 may include a beacon detector for identifying conference participants by a beacon such as a low energy Bluetooth beacon associated with a conference participant's device.

Figure 12:
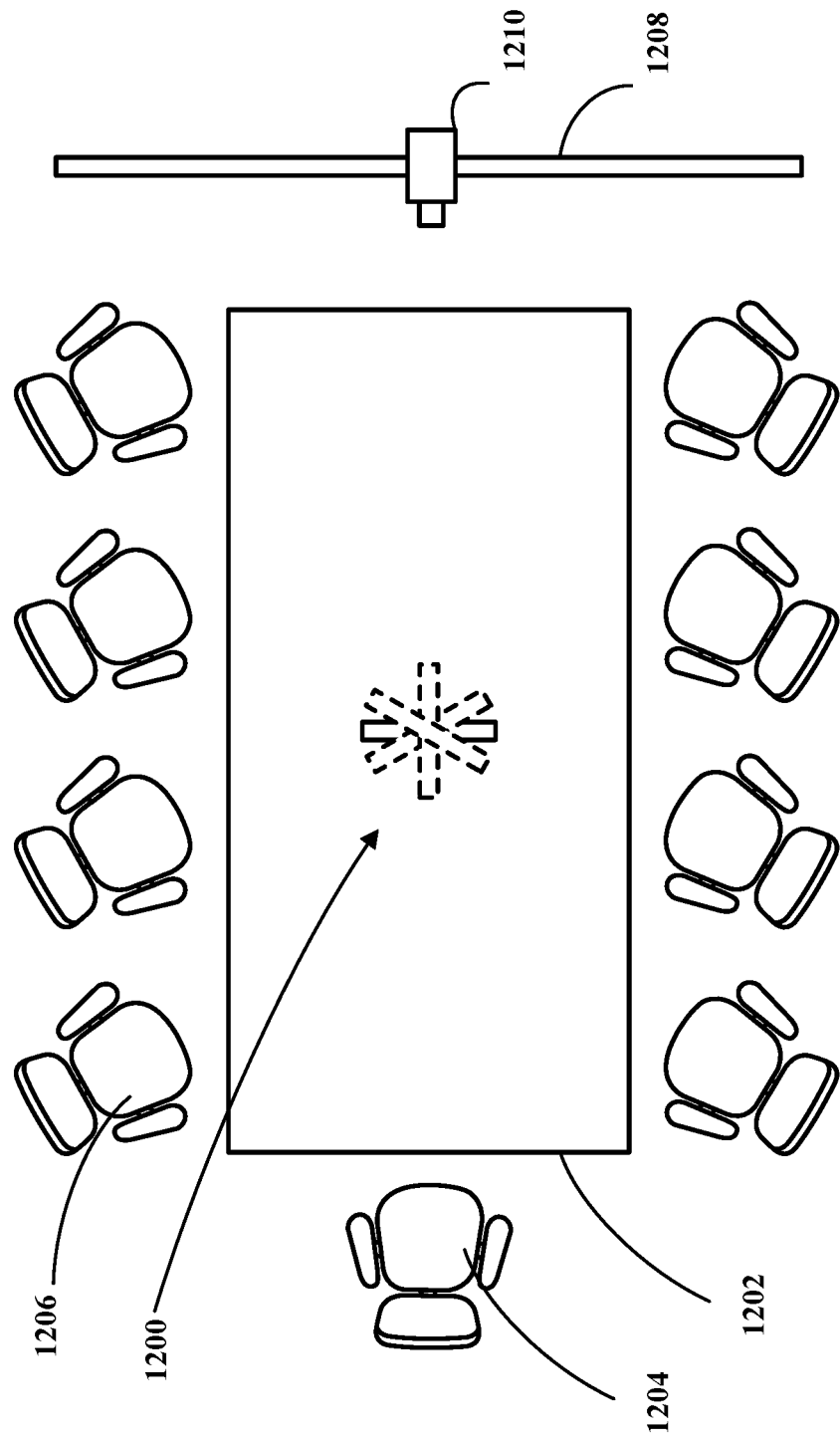
FIG. 12 is a top-down diagram of an example of a shared conference space including a shared conference space system integrated in a single housing.

FIG. 12 is a top-down diagram of an example of a shared conference space including a shared conference space system 1200 integrated in a single chassis, such as the shared conference space system 1100 of FIG. 11. In the example of FIG. 12, the shared conference space system 1200 is positioned on a conference table 1202. The shared conference space system 1200 can be manipulated by conference participants to face in varying directions as shown by the dashed outlines. For example, a first conference participant located in a first chair 1204 can orient the shared conference space system 1200 to face the first conference participant as shown by the solid outline of the shared conference space system. A second conference participant located in a second chair 1206 can swivel the display to face the second conference participant to enable the second conference participant to interact with the shared conference space system. The shared conference space system 1200 may be rotated in other directions to face other conference participants.

In some implementations, the shared conference space system 1200 can be integrated with a video conference system. For example, the shared conference space of FIG. 12 includes a video conference display 1208 configured for displaying video feeds of remote conference participants and a video conference camera 1210 for capturing video of the shared conference space. The video conference system can share the identity of remote conference participants with the shared conference space system 1200. The shared conference space system 1200 can treat the remote conference participants identified by the video conference system similar to the local conference participants. For example, schedule views of remote participant digital calendars may be displayed at the shared conference space system 1200 to allow local conference participants to schedule future conferences with the remote conference participants. In some implementations, the video conference system provides the identities of the remote participants based on credentials the remote conference participants used to authenticate with the video conference system.

Figure 13:
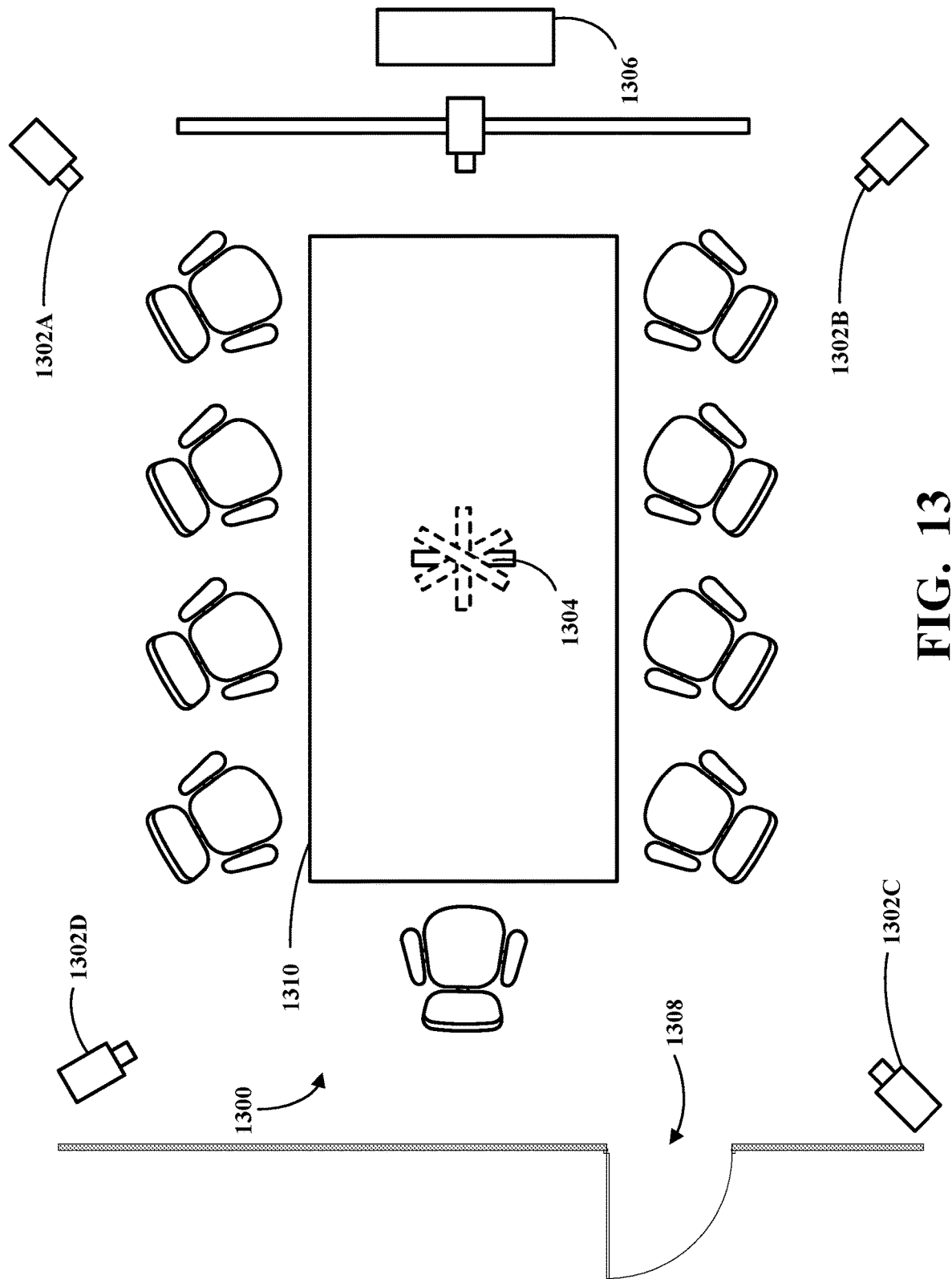
FIG. 13 is a top-down diagram of an example of a shared conference space including a shared conference space system distributed in discrete components.

FIG. 13 is a top-down diagram of an example of a shared conference space system 1300 distributed in discrete components. The example of FIG. 13 is generally similar to the example of FIG. 12, with the exception that in the example of FIG. 13, a sensor component 1302 and a display component 1304 of the shared conference space system 1300 are located remotely from a control system component 1306. In this example, the sensor component 1302 includes four cameras 1302A-1302D (collectively referred to as sensor component 1302) at each corner of the shared conference space. The four cameras 1302A-1302D capture image data of the conference participants of the shared conference space. Additionally, the four cameras 1302A-1302D monitor an exit 1308 of the shared conference space to determine when a conference participant exits the shared conference space. For example, as described previously, the shared conference space system 1300 can remove a schedule view of a conference participant digital calendar from the schedule view of the shared conference space digital calendar in response to the shared conference space system 1300 determining that the conference participant is exiting the shared conference space. The display component 1304 implements a GUI for controlling the shared conference space system 1300. The GUI can be the GUI of FIG. 6 through FIG. 10. Like the shared conference space system 1200 of FIG. 12, the display component 1304 of FIG. 13 is mounted to a table 1310 and configured to swivel and rotate to facilitate conference participant interaction from different seating locations in the shared conference space.

Figure 14:
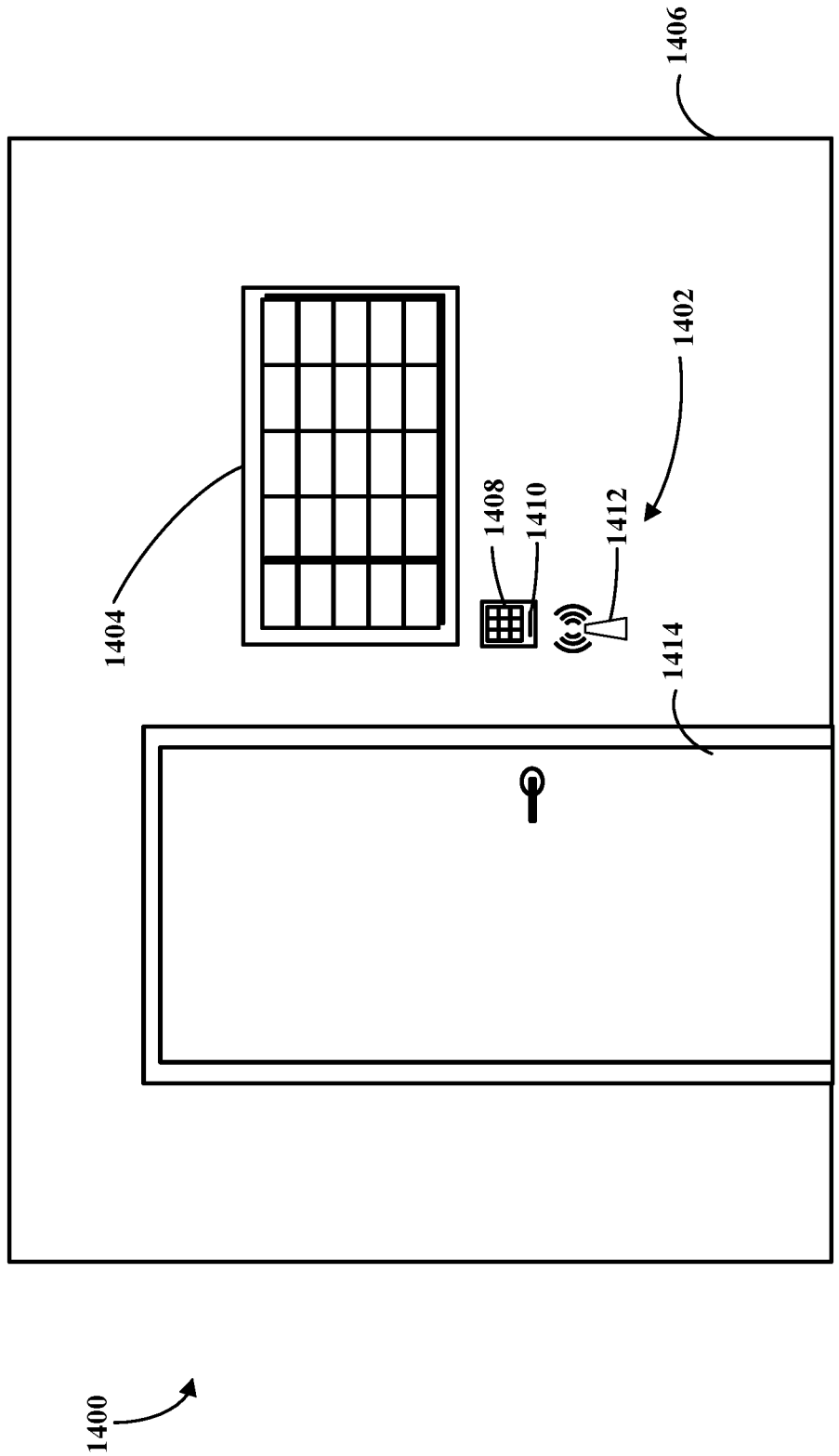
FIG. 14 is an illustration of an example of an exterior of a shared conference space having an external shared conference space system.

FIG. 14 illustrates an example of an exterior of a shared conference space having an external shared conference space system 1400. The components displayed in FIG. 14 can be integrated with the shared conference space systems described in relation to FIG. 11 through FIG. 13. The system of FIG. 14 differs from the previously described systems in that in the system of FIG. 14, a sensor component 1402 and a display component 1404 are located externally to the shared conference space. In this implementation, the sensor component 1402 and the display component 1404 are located on an exterior wall 1406 of the shared conference space adjacent a door 1414 providing access to the shared conference space. Additionally, the sensor component 1402 of FIG. 14 is integrated with an access control system for the shared conference space. In some implementations, the control component (not shown) can be integrated within the display component 1404, or in other implementations can be located at another location such as within the shared conference space.

The display component 1404 implements a GUI for controlling the shared conference space system 1400. The GUI can be the GUI of FIG. 6 through FIG. 10. In some instances, the shared conference space system includes an additional display component within the shared conference space. The shared conference space system operates similarly to the previously described examples, with the exception that the sensor component 1402 captures conference participant identifying information prior to a conference participant entering the shared conference space.

The sensor component 1402 in the example of FIG. 14 is integrated with an access control system that utilizes a keycard reader 1408, a touch pad 1410, and/or a beacon sensor 1412 to control access to the shared conference space. The access control system identifies a conference participant's credentials when they scan a keycard using the keycard reader, enter a conference participant code using the touch pad 1410, or scan a device using the beacon reader 1412. The access control system controls access to the shared conference space based on the conference participant's credentials.

A conference participant accesses the shared conference space by providing their conference participant credentials. The access control system sends the credential information or the identify of a conference participant associated with the credential information to the shared conference space system for automated integration of conference participant information in the shared conference room digital calendar. In instances where the access control system passes on conference participant credentials, the shared conference space system determines the conference participant's identity by using the credential information to look up the conference participant's identity. In some instances, the shared conference space system looks up the conference participant's identity using an external software service. In either instance, the shared conference space system identifies the conference participant based on the credential information received at the sensor component 1402. The shared conference space system then displays the conference participant's identity on a display component along with the schedule view of the shared conference space digital calendar and, in some implementations, the schedule view of the conference participant digital calendar as described previously.

In some examples, the shared conference space system 1400 includes an image sensor on the outside of the shared conference space adjacent the display component 1404. In such instances, the shared conference space system 1400 detects when the conference participant is near, e.g., within an arm's reach of the display component 1404, and displays the schedule view of the conference participant digital calendar adjacent a schedule view of the shared conference space digital calendar. The conference participant is then able to interact with the GUI of the display component 1404 to schedule a conference as described previously. In this manner a conference participant may quickly schedule the shared conference space even when they are not a participant of a current conference taking place in the shared conference space.

The implementations of this disclosure correspond to methods, non-transitory computer readable media, apparatuses, systems, devices, and the like. In some implementations, a method comprises determining, by a shared conference space system configured for use with a shared conference space, identities of a set of conference participants; associating, by the shared conference space system, the identities of the set of conference participants to a shared conference space digital calendar associated with the shared conference space; and outputting, to a display of the shared conference space system, a portion of the shared conference space digital calendar including the identities of the set of conference participants. In some implementations, an apparatus comprises a conference participant sensor; a display; a memory and a processor configured to execute instructions stored in the memory to determine, using the conference participant sensor, identities of a set of conference participants of a shared conference space; associate the identities of the set of conference participants to a shared conference space digital calendar associated with the shared conference space; and output a portion of the shared conference space digital calendar to the display including the identities of the set of conference participants. In some implementations, a non-transitory computer readable medium stores instructions operable to cause one or more processors to perform operations comprising determining, using a sensor associated with a shared conference space system configured for use with a shared conference space, identities of a set of conference participants of a shared conference space; associating, by the shared conference space system, the identities of the set of conference participants to a shared conference space digital calendar associated with the shared conference space; and outputting, to a display of the shared conference space system, a portion of the shared conference space digital calendar including the identities of the set of conference participants.

In some implementations of the method, non-transitory computer readable medium, or apparatus, the method comprises, the operations comprise, or the processor is configured to execute the instructions for accessing, by the shared conference space system, digital calendar data for the set of conference participants; and adding, by the shared conference space system, the digital calendar data to the portion of the shared conference space digital calendar.

In some implementations of the method, non-transitory computer readable medium, or apparatus, the method comprises, the operations comprise, or the processor is configured to execute the instructions for accessing, by the shared conference space system, sharing permissions for conference participant digital calendars of the set of conference participants; verifying, by the shared conference space system, that the sharing permissions for the conference participant digital calendars allow the sharing of conference participant digital calendar data; and adding, by the shared conference space system, digital calendar data for the set of conference participants to the portion of the shared conference space digital calendar.

In some implementations of the method, non-transitory computer readable medium, or apparatus, the method comprises, the operations comprise, or the processor is configured to execute the instructions for determining, by the shared conference space system, identities of a second set of conference participants of shared conference space; accessing, by the shared conference space system, sharing permission for conference participant digital calendars of the set of conference participants and the second set of conference participants; verifying, by the shared conference space system, that the sharing permissions for the conference participant digital calendars of the set of conference participants allow sharing digital calendar data and that the sharing permissions for the conference participant digital calendars of the second set of conference participants does not allow sharing digital calendar data; adding, by the shared conference space system, digital calendar data for the set of conference participants to the portion of the shared conference space digital calendar; and masking, by the shared conference space system, digital calendar data for the second set of conference participants in the display of a portion of the shared conference space digital calendar.

In some implementations of the method, non-transitory computer readable medium, or apparatus, the method comprises, the operations comprise, or the processor is configured to execute the instructions for determining, by the shared conference space system, that a conference participant of the set of conference participants left the shared conference space; removing, by the shared conference space system, an identity of the conference participant from the shared conference space digital calendar to generate an updated shared conference space digital calendar; and outputting, by the shared conference space system, an update to the display of a portion of the shared conference space digital calendar to reflect the updated shared conference space digital calendar.

In some implementations of the method, non-transitory computer readable medium, or apparatus, the method comprises, the operations comprise, or the processor is configured to execute the instructions for updating, by the shared conference space system, digital calendars of the set of conference participants to indicate that they are in a conference occurring in the shared conference space.

In some implementations of the method, non-transitory computer readable medium, or apparatus, the method comprises, the operations comprise, or the processor is configured to execute the instructions for receiving, by the shared conference space system, an input selecting a conference participant and a conference time for a second conference at the shared conference space; reserving, by the shared conference space system, the shared conference space for the conference time; and outputting, by the shared conference space system, a prompt to invite the set of conference participants to the second conference.

In some implementations of the method, non-transitory computer readable medium, or apparatus, the identities of the set of conference participants are determined using facial recognition, a Bluetooth Low Energy beacon of a device of a conference participant, a near field communication interaction of a device of a conference participant, a manual log in of a conference participant, a security badge sign-in of a conference participant, or biometric scan of a conference participant.

In some implementations of the method, non-transitory computer readable medium, or apparatus, the portion of the shared conference space digital calendar is displayed at an interactive terminal associated with the shared conference space.

In some implementations of the method, non-transitory computer readable medium, or apparatus, the method comprises, the operations comprise, or the processor is configured to execute the instructions for accessing digital calendar data for the conference participants of the set of conference participants; and outputting the digital calendar data with the identities of the set of conference participants.

In some implementations of the method, non-transitory computer readable medium, or apparatus, the method comprises, the operations comprise, or the processor is configured to execute the instructions for receiving an input selecting a conference participant and a conference time for the shared conference space; reserve the shared conference space for the conference time; and update the conference participant digital calendar to include the shared conference space reservation.

In some implementations of the method, non-transitory computer readable medium, or apparatus, the method comprises, the operations comprise, or the processor is configured to execute the instructions for updating digital calendars of the set of conference participants to associate a current conference in the shared conference space with each conference participant.

In some implementations of the method, non-transitory computer readable medium, or apparatus, the method comprises, the operations comprise, or the processor is configured to execute the instructions for determining that a conference participant of the set of conference participants left the shared conference space; remove an identity of the conference participant from the shared conference space digital calendar; and updating the portion of the shared conference space digital calendar to remove the identity of the conference participant that left the shared conference space.

In some implementations of the method, non-transitory computer readable medium, or apparatus, the method comprises, the operations comprise, or the processor is configured to execute the instructions for accessing, by the shared conference space system, digital calendar data for a conference participant of the set of conference participants; and adding, by the shared conference space system, the digital calendar data of the conference participant to the portion of the shared conference space digital calendar.

In some implementations of the method, non-transitory computer readable medium, or apparatus, the method comprises, the operations comprise, or the processor is configured to execute the instructions for accessing, by the shared conference space system, sharing permissions for a conference participant digital calendar of the set of conference participants; verifying, by the shared conference space system, that the sharing permissions for the conference participant digital calendar allow the sharing of the conference participant digital calendar data; and adding, by the shared conference space system, digital calendar data for the conference participant of the set of conference participants to the portion of the shared conference space digital calendar.

In some implementations of the method, non-transitory computer readable medium, or apparatus, the method comprises, the operations comprise, or the processor is configured to execute the instructions for determining, by the shared conference space system, that a conference participant of the set of conference participants is no longer in the shared conference space; removing, by the shared conference space system, an identity of the conference participant from the shared conference space digital calendar to generate an updated shared conference space digital calendar; and outputting, by the shared conference space system, an update to the display of a portion of the shared conference space digital calendar to reflect that the identity of the conference participant was removed.

In some implementations of the method, non-transitory computer readable medium, or apparatus, the method comprises, the operations comprise, or the processor is configured to execute the instructions for updating, by the shared conference space system, digital calendars of the set of conference participants to indicate that the conference participants are in a conference occurring in the shared conference space responsive to the shared conference space system determining the identity of the set of conference participants.

In some implementations of the method, non-transitory computer readable medium, or apparatus, the method comprises, the operations comprise, or the processor is configured to execute the instructions for receiving, by the shared conference space system, an input selecting a conference participant and a conference time for a second conference at the shared conference space; and updating, by the shared conference space system, the shared conference space digital calendar to include the second conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, lookup tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting beacons from respective devices of a first set of conference participants for automatic identification;
   automatically determining, by a shared conference space system configured for use with a shared conference space, identities of the first set of conference participants based on the beacons;
   associating, by the shared conference space system, the identities of the first set of conference participants to a shared conference space digital calendar associated with the shared conference space;
   determining, by the shared conference space system, identities of a second set of conference participants of the shared conference space;
   outputting, to a display of the shared conference space system, a portion of the shared conference space digital calendar including the identities of the first set of conference participants; and
   masking, by the shared conference space system, digital calendar data for the second set of conference participants in the display of the portion of the shared conference space digital calendar based on a sharing permission for conference participant digital calendars of the second set of conference participants that does not allow sharing digital calendar data.

2. The method of claim 1, further comprising:
   accessing, by the shared conference space system, digital calendar data for the first set of conference participants; and
   adding, by the shared conference space system, the digital calendar data to the portion of the shared conference space digital calendar.

3. The method of claim 1, further comprising:
   accessing, by the shared conference space system, sharing permissions for conference participant digital calendars of the first set of conference participants;
   verifying, by the shared conference space system, that the sharing permissions for the conference participant digital calendars allow the sharing of conference participant digital calendar data; and adding, by the shared conference space system, digital calendar data for the first set of conference participants to the portion of the shared conference space digital calendar.

4. The method of claim 1, further comprising:
determining, by the shared conference space system, that a conference participant of the first set of conference participants left the shared conference space;
removing, by the shared conference space system, an identity of the conference participant from the shared conference space digital calendar to generate an updated shared conference space digital calendar; and
outputting, by the shared conference space system, an update to the display of a portion of the shared conference space digital calendar to reflect the updated shared conference space digital calendar.

5. The method of claim 1, further comprising:
updating, by the shared conference space system, digital calendars of the first set of conference participants to indicate that they are in a conference occurring in the shared conference space.

6. The method of claim 1, further comprising:
receiving, by the shared conference space system, an input selecting a conference participant and a conference time for a second conference at the shared conference space;
reserving, by the shared conference space system, the shared conference space for the conference time; and
outputting, by the shared conference space system, a prompt to invite the first set of conference participants to the second conference.

7. The method of claim 1, wherein the beacons are Bluetooth Low Energy beacons.

8. The method of claim 1, wherein the portion of the shared conference space digital calendar is displayed at an interactive terminal associated with the shared conference space.

9. An apparatus, comprising:
a sensor configured to detect beacons from respective devices of a first set of conference participants for automatic identification;
a display;
a memory; and
a processor configured to execute instructions stored in the memory to:
automatically determine, using the sensor, identities of the first set of conference participants of a shared conference space based on the beacons;
associate the identities of the first set of conference participants to a shared conference space digital calendar associated with the shared conference space;
determine identities of a second set of conference participants of the shared conference space;
output a portion of the shared conference space digital calendar to the display including the identities of the first set of conference participants; and
mask digital calendar data for the second set of conference participants in the display of the portion of the shared conference space digital calendar based on a sharing permission for conference participant digital calendars of the second set of conference participants that does not allow sharing digital calendar data.

10. The apparatus of claim 9, wherein the processor is further configured to execute instructions stored in memory to:
access digital calendar data for the conference participants of the first set of conference participants; and
output the digital calendar data with the identities of the first set of conference participants.

11. The apparatus of claim 9, wherein the processor is further configured to execute instructions stored in memory to:
receive an input selecting a conference participant and a conference time for the shared conference space;
reserve the shared conference space for the conference time; and
update the conference participant digital calendar to include the shared conference space reservation.

12. The apparatus of claim 9, wherein the processor is further configured to execute instructions stored in memory to:
update digital calendars of the first set of conference participants to associate a current conference in the shared conference space with each conference participant.

13. The apparatus of claim 9, wherein the processor is further configured to execute instructions stored in memory to:
determine that a conference participant of the first set of conference participants left the shared conference space;
remove an identity of the conference participant from the shared conference space digital calendar; and
update the portion of the shared conference space digital calendar to remove the identity of the conference participant that left the shared conference space.

14. A non-transitory computer-readable medium storing instructions operable to cause one or more processors to perform operations comprising:
detecting beacons, using a sensor associated with a shared conference space system configured for use with a shared conference space, the beacons from respective devices of a first set of conference participants for automatic identification;
determining identities of the first set of conference participants of a shared conference space based on the beacons;
associating, by the shared conference space system, the identities of the first set of conference participants to a shared conference space digital calendar associated with the shared conference space;
determining, by the shared conference space system, identities of a second set of conference participants of the shared conference space;
outputting, to a display of the shared conference space system, a portion of the shared conference space digital calendar including the identities of the first set of conference participants; and
masking, by the shared conference space system, digital calendar data for the second set of conference participants in the display of the portion of the shared conference space digital calendar based on a sharing permission for conference participant digital calendars of the second set of conference participants that does not allow sharing digital calendar data.

15. The non-transitory computer-readable medium of claim 14, wherein the instructions are further operable to cause one or more processors to perform operations comprising:
accessing, by the shared conference space system, digital calendar data for a conference participant of the first set of conference participants; and adding, by the shared conference space system, the digital calendar data of the conference participant to the portion of the shared conference space digital calendar.

16. The non-transitory computer-readable medium of claim 14, wherein the instructions are further operable to cause one or more processors to perform operations comprising:
 accessing, by the shared conference space system, sharing permissions for a conference participant digital calendar of the first set of conference participants;
 verifying, by the shared conference space system, that the sharing permissions for the conference participant digital calendar allow the sharing of the conference participant digital calendar data; and
 adding, by the shared conference space system, digital calendar data for the conference participant of the first set of conference participants to the portion of the shared conference space digital calendar.

17. The non-transitory computer-readable medium of claim 14, wherein the instructions are further operable to cause one or more processors to perform operations comprising:
 determining, by the shared conference space system, that a conference participant of the first set of conference participants is no longer in the shared conference space;
 removing, by the shared conference space system, an identity of the conference participant from the shared conference space digital calendar to generate an updated shared conference space digital calendar; and
 outputting, by the shared conference space system, an update to the display of a portion of the shared conference space digital calendar to reflect that the identity of the conference participant was removed.

18. The non-transitory computer-readable medium of claim 14, wherein the instructions are further operable to cause one or more processors to perform operations comprising:
 updating, by the shared conference space system, digital calendars of the first set of conference participants to indicate that the conference participants are in a conference occurring in the shared conference space responsive to the shared conference space system determining the identity of the first set of conference participants.

19. The non-transitory computer-readable medium of claim 14, wherein the instructions are further operable to cause one or more processors to perform operations comprising:
 receiving, by the shared conference space system, an input selecting a conference participant and a conference time for a second conference at the shared conference space; and
 updating, by the shared conference space system, the shared conference space digital calendar to include the second conference.

20. The method of claim 1, further comprising:
 verifying, by the shared conference space system, that sharing permissions for the conference participant digital calendars of the first set of conference participants allow the sharing of conference participant digital calendar data.

* * * * *